US012807191B2

(12) United States Patent
Ahmad et al.

(10) Patent No.: US 12,807,191 B2
(45) Date of Patent: Nov. 24, 2026

(54) RELEVANCE BASED SCENARIO PROBABILITY

(71) Applicant: Zoox, Inc., Foster City, CA (US)

(72) Inventors: Shakeeb Ahmad, San Mateo, CA (US); Gowtham Garimella, Hayward, CA (US); Carl-Johan Hoel, San Mateo, CA (US); Xianan Huang, Foster City, CA (US); Marin Kobilarov, Baltimore, MD (US); Sahil Narang, San Francisco, CA (US); Jeremy Schwartz, Redwood City, CA (US); Ke Sun, Foster City, CA (US); Linjun Zhang, Foster City, CA (US)

(73) Assignee: Zoox, Inc., Foster City, CA (US)

(*) Notice: Subject to any disclaimer, the term of this patent is extended or adjusted under 35 U.S.C. 154(b) by 13 days.

(21) Appl. No.: 19/042,365

(22) Filed: Jan. 31, 2025

(65) Prior Publication Data

US 2026/0225622 A1 Aug. 6, 2026

(51) Int. Cl.
*B60W 60/00* (2020.01)
*B60W 50/00* (2006.01)

(52) U.S. Cl.
CPC .... *B60W 60/0027* (2020.02); *B60W 50/0097* (2013.01); *B60W 2050/0022* (2013.01); *B60W 2554/404* (2020.02)

(58) Field of Classification Search
CPC ...................... B60W 60/0027; B60W 50/0097
See application file for complete search history.

(56) References Cited

U.S. PATENT DOCUMENTS 10,649,459 B2 5/2020 Wang et al.
10,921,811 B2 2/2021 Levinson et al.
(Continued)

FOREIGN PATENT DOCUMENTS

CN 114802302 A 7/2022
CN 118012047 A 5/2024
KR 20200072573 A 6/2020

OTHER PUBLICATIONS

U.S. Appl. No. 18/375,292, filed Sep. 29, 2023, Zhang, et al., "Parallel Processing Filter for Detecting Object Relevance To Vehicle Operation Planning", 73 pages.
(Continued)

*Primary Examiner* — Shayne M. Gilbertson
(74) *Attorney, Agent, or Firm* — Lee & Hayes, P.C.

(57) ABSTRACT

Techniques for generating predicted driving scenarios based on relevancy data are described herein. A vehicle may detect an object and generate predicted object trajectories and probabilities associated therewith. The vehicle may determine a relevance score that indicates a level of relevance of each object trajectory with respect to the vehicle. The vehicle may use the object trajectory probabilities and relevance scores to generate predicted driving scenarios and/or probabilities associated therewith. The vehicle may use the predicted driving scenario when determining a control trajectory for the vehicle to follow. That is, the vehicle may determine cost values that represent the cost of following a specific candidate action. The vehicle may weight some or all of the cost values by a fraction of the object trajectory probability and the predicted scenario probability. Based on the weighted cost values, the vehicle can determine one or more of the candidate actions to follow.

20 Claims, 7 Drawing Sheets

(56) References Cited

U.S. PATENT DOCUMENTS

| | | | | |
|---|---|---|---|---|
| 10,955,851 | B2 | 3/2021 | Ghafarianzadeh et al. | |
| 11,169,531 | B2 | 11/2021 | Hong et al. | |
| 11,772,643 | B1 | 10/2023 | Packer et al. | |
| 11,801,864 | B1 | 10/2023 | Arora et al. | |
| 11,875,678 | B2 | 1/2024 | Huang et al. | |
| 12,187,324 | B2 | 1/2025 | Caldwell | |
| 2020/0117200 | A1* | 4/2020 | Akella | B60W 30/0956 |
| 2020/0339116 | A1 | 10/2020 | Xu et al. | |
| 2021/0124353 | A1 | 4/2021 | Dally et al. | |
| 2023/0182782 | A1* | 6/2023 | Zhang | B60W 60/0011 701/26 |
| 2024/0326792 | A1* | 10/2024 | Puphal | B60W 30/09 |

OTHER PUBLICATIONS

U.S. Appl. No. 18/540,642, filed Dec. 14, 2023, Kulgod, et al., “Machine-Learned Cost Estimation in Tree Search Trajectory Generation for Vehicle Control”, 88 pages.
U.S. Appl. No. 18/900,446, filed Sep. 27, 2024, Ahmad, et al., “Scenario Generation”, 46 pages.
Office Action for U.S. Appl. No. 19/042,481, Dated Apr. 8, 2026, 9 pages.
Search Report and Written Opinion for International Application No. PCT/US2026/012992, Dated May 28, 2026, 11 pages.

* cited by examiner

RELEVANCE BASED SCENARIO PROBABILITY

BACKGROUND

Vehicles, such as autonomous vehicles, may navigate along designated routes. In some examples, the vehicle may navigate proximate dynamic and/or static objects. The vehicle may generate vehicle actions based on predicting future actions of the object(s). However, in some circumstances, techniques for generating vehicle actions based on the predicted future actions of the object(s) may result in inaccurate and/or suboptimal results.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
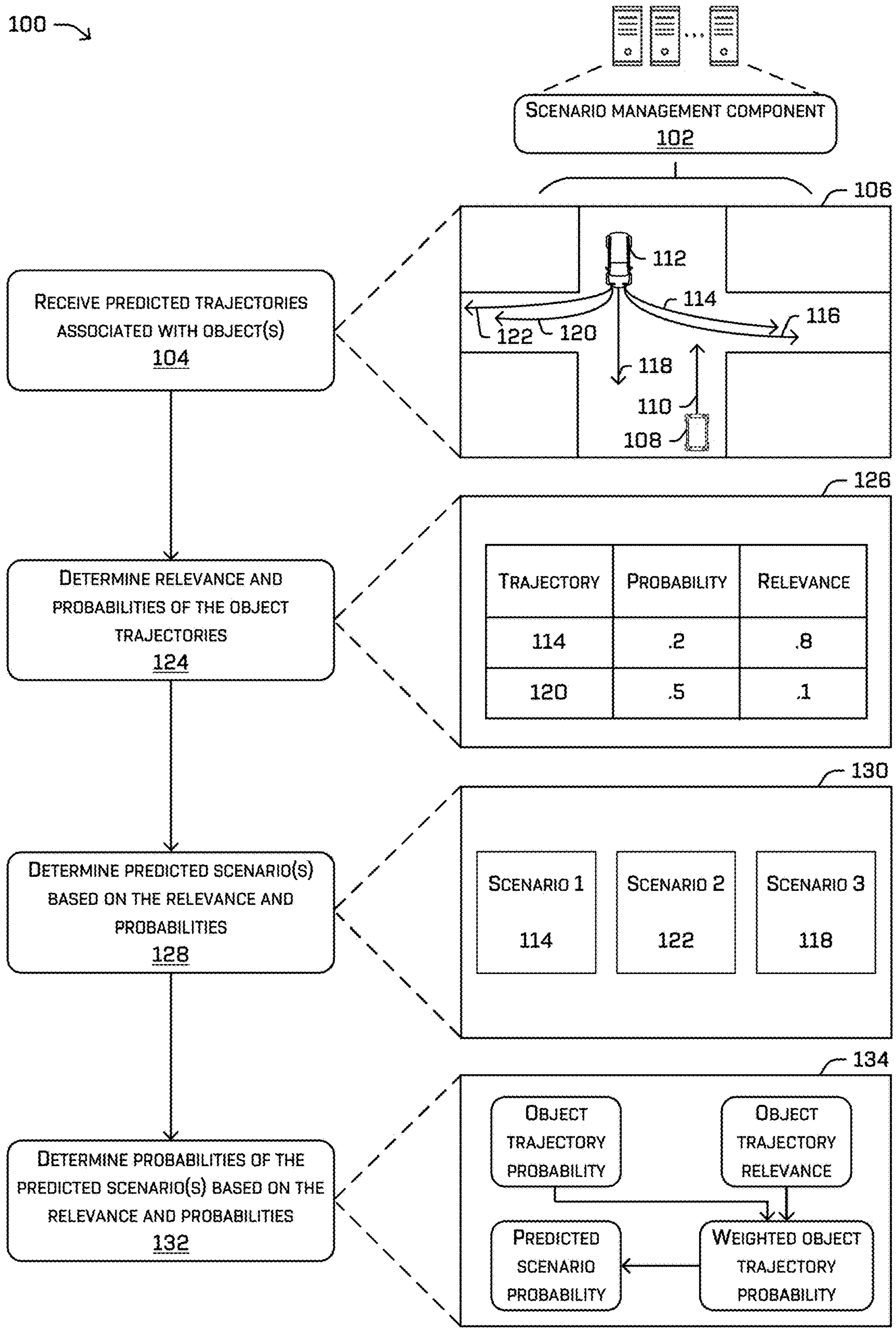
FIG. 1 is a pictorial flow diagram illustrating an example technique for generating predicted driving scenario data based on relevance data, in accordance with one or more examples of the disclosure.

Techniques for incorporating relevancy data when predicting and responding to driving scenarios is described herein. In some examples, a vehicle (such as an autonomous vehicle) may detect an object within an environment. Based on detecting the object, the vehicle may generate predicted object trajectories and/or associated probabilities indicating likelihoods the object will follow the various predicted object trajectories. Further, the vehicle may determine a relevance score that indicates the level of relevance of each object trajectory with respect to the vehicle. As described in detail below, such relevancy may be related to a likelihood that the object may impact the travel of the vehicle. In some instances, multiple scenarios may be generated to predict how the environment may evolve. In each such scenario, any number of objects may be associated with one or more paths, probabilities associated with such paths, and/or a relevancy or relevancies. The vehicle may use the object trajectory probabilities and relevance scores to generate predicted driving scenarios (e.g., single prediction that depicts how the object(s) in the environment may evolve over a period of time) and/or probabilities associated therewith. The vehicle may use the predicted driving scenarios when determining a control trajectory for the vehicle to follow. That is, the vehicle may determine cost values that represent the cost of following a specific candidate action. In such cases, the vehicle may weight some or all of the cost values using a combination of one or more of the object trajectory probability and/or the predicted scenario probability, as will be described in more detail herein. Based on the weighted cost values, the vehicle can determine one or more of the candidate actions to follow. As described in more detail below, the techniques described herein may improve vehicle safety and/or driving efficiency by increasing the ability of the vehicle to account for predicted driving scenarios that include the relevance of object trajectories, thereby allowing the vehicle to generate and/or perform safer actions.

When generating predicted scenarios that describe how a scene may evolve over time, it may be beneficial to consider the importance (or relevance) of the object trajectories relative to the vehicle. For example, the vehicle may detect one or more objects proximate the vehicle. In such cases, the vehicle may generate multiple object trajectories that represent where and/or how the object may proceed through the environment. Further, the vehicle may generate probabilities associated with such object trajectories that indicate how likely the object is to follow the predicted trajectories for any scenario. Based on generating the object trajectories and the associated probabilities, the vehicle may generate one or more predicted scenarios, each of which represents a prediction for how each object will react in the environment (e.g., one predicted trajectory for every object in the environment). The vehicle may further generate a predicted scenario probability based on averaging the object trajectory probabilities within the predicted scenario. However, in some circumstances, the probabilities of the predicted scenarios may fail to accurately represent the importance of one or more trajectories of the object to the vehicle. For example, in some predicted scenarios, some object trajectories may be more relevant to the vehicle than other object trajectories (e.g., an object trajectory crossing a vehicle trajectory may be more relevant than an object trajectory which never intersects a trajectory of the vehicle). However, merely averaging all of the object trajectories in the predicted scenarios may fail to give weight to the highly important object trajectories, thereby causing the vehicle to generate vehicle actions that may be suboptimal and/or inefficient. As such, the techniques and/or systems described herein may increase the quality and/or accuracy of the probabilities of the predicted scenarios.

To address these and other technical problems and inefficiencies, the systems and/or techniques described herein include a scenario management component (also referred to as a "scenario management system" or "scenario manager")

configured to generate predicted scenarios based on relevancy data. Further, the systems and/or techniques described herein include a planning component (also referred to as a "planner component" or "planner") configured to utilize the predicted driving scenario probability to scale costs when determining which candidate action to follow. Technical solutions discussed herein solve one or more problems associated with inaccurate and/or suboptimal predicted driving scenarios.

In some examples, the vehicle may receive sensor data representative of an environment. That is, the vehicle may capture sensor data while navigating an environment. The vehicle may include one or more sensor device(s) (e.g., lidar device(s), radar device(s), time-of-flight device(s), image capturing device(s), etc.) located or mounted at various positions within or on the vehicle body. In such cases, the sensor device(s) may capture sensor data of the environment proximate the vehicle.

In some examples, the vehicle may detect one or more object(s) based on the sensor data. That is, the vehicle may analyze the sensor data and identify one or more object(s) within the environment. For example, the sensor data may include one or more static and/or dynamic objects such as other vehicle(s) (e.g., cars, trucks, motorcycles, cyclists, etc.), pedestrians, animals, stationary object(s) (e.g., dynamic objects that have a velocity of zero), trees, bushes, buildings, signage, road markings, etc. The vehicle may detect the object(s) using one or more machine learned models. In some examples, the object(s) may include various types of object data (or object features) such as a classification (or type), a pose (e.g., position (e.g., x- and y-coordinate) and/or heading (or yaw)), a size, a velocity, an acceleration, a track (or history), etc.

In some examples, the vehicle may generate predicted object trajectories for the object(s). That is, the vehicle may generate one or more unique object trajectories for some or all object(s) within the environment. Examples of techniques for predicting trajectories for objects in an environment can be found, for example, in U.S. Pat. No. 11,169,531, issued Nov. 9, 2021, and titled "Trajectory Prediction on Top-Down Scenes," the content of which is herein incorporated by reference in its entirety and for all purposes. Further, the vehicle may generate probabilities that indicate the likelihood the object may follow such predicted object trajectories. The vehicle may generate the probabilities based on one or more factors such as a state of the object (e.g., presence of a blinker, current velocity, pose, etc.), object type, time of day, etc.

In some examples, the vehicle may generate relevance scores for each object trajectory. The relevance score may indicate a level (or degree) of relevance (e.g., scaler value) of an object trajectory to the vehicle and/or to a specific vehicle candidate action. In such cases, the vehicle may determine the relevance scores for some or all predicted object trajectories by inputting such trajectories into a relevance filter which may return relevance scores associated therewith. Examples of techniques for determining relevancy can be found, for example, in U.S. Pat. No. 11,772,643, issued Oct. 3, 2023, and titled "Object Relevance Determination" and U.S. patent application Ser. No. 18/375,292, filed on Sep. 29, 2023, and titled "Parallel Processing Filter For Detecting Object Relevance to Vehicle Operation Planning," the contents of both of which are herein incorporated by reference in their entirety and for all purposes.

Based on determining the predicted object trajectories, the associated probabilities, and the relevance scores, the vehicle may use such data to generate predicted scenarios and/or the associated probability of the scenario which may be sent to a planning component to determine future actions of the vehicle. A predicted scenario may be a single prediction of how object(s) in the environment may move over a period of time. For example, when generating the predicted scenario, the vehicle may incorporate a single predicted object trajectory of each object into each predicted scenario. That is, if there are three predicted driving scenarios, the vehicle may include a single predicted object trajectory from each object into each of the three predicted driving scenarios. Examples of techniques for generating predicted driving scenarios can be found in, for example, U.S. patent application Ser. No. 18/900,446, filed Sep. 27, 2024, and titled "Scenario Generating," the content of which is herein incorporated by reference in its entirety and for all purposes.

In addition to the techniques described in the reference that is incorporated by reference above, the vehicle may generate the predicted scenario based on ranking the object trajectories. The ranking may represent a hierarchy of the object trajectories according to importance of the object trajectory to the vehicle. The vehicle may determine the ranking based on the relevance score and/or the object trajectory probabilities. In some cases, the vehicle may determine the rank for a specific object trajectory by dividing the relevance of the object trajectory by the probability of the same object trajectory as well as, in some instances, a fixed scalar. The result of such operations may be a value associated with the object trajectory. As a non-limiting example, a highly relevant object (e.g., having a relevancy of 90%) may be upweighted when determining a resultant vehicle trajectory despite having a low probability for an associated trajectory (e.g., only a 1% probability of the trajectory occurring). In such a scenario, the contribution may be associated with a score of 90 (0.9/0.01), significantly increasing the impact of the relevant object on informing planning behavior for the vehicle. In some cases, after performing such operations on some or all object trajectories, the vehicle may organize the object trajectories into a ranking based on the values with the highest ranking being indicative of the most important to the vehicle. In some cases, the vehicle may generate the predicted scenarios based on the ranking. For example, if there are three predicted scenarios, the vehicle may include the highest ranked object trajectory in the first predicted scenario, the next highest ranked trajectory in the second predicted scenario, etc. Additionally or alternatively, when generating the final predicted scenario, the vehicle may identify, from the object trajectories that are not yet included in a predicted scenario, the predicted object trajectories that have probabilities within a threshold range of one another. In such cases, the vehicle may include one or more of such trajectories into the scenario.

Based on generating the predicted scenario, the scenario management component may determine a probability associated with the predicted scenario. The probability of the predicted scenario may represent how likely the scenario is to occur. In some examples, the vehicle may determine the probability of the predicted scenario by weighting the object trajectory probabilities by the associated relevance scores and then averaging the weighted probabilities. For example, for the object trajectories in the driving scenario, the vehicle may determine modified (or weighted) probabilities by weighting (e.g., multiplying) the probability of the object trajectory with the object trajectory relevance score. Based on determining the modified object trajectory probabilities, the vehicle may determine the predicted scenario probability by averaging the modified object trajectory probabilities. In some cases, after determining the predicted scenario probability, the vehicle may normalize the predicted scenario. As noted below, the vehicle may use the predicted scenario and the predicted scenario probability when determining which candidate action for the vehicle to follow.

Additionally or alternatively, the vehicle may determine the predicted scenario probabilities by minimizing the difference between the scenario probability and the object trajectory probability. That is, the vehicle may determine the predicted scenario and/or the predicted scenario probability by performing the following equation:

$$\min_{p(s_i)} \frac{1}{2} \sum_{j=0}^{N_Z-1} \sum_{i=0}^{N_S-1} r(s_i(Z_j))(p(s_i(Z_j)) - p(s_i))^2 \quad \text{Equation 1}$$

In this equation $N_z$ represents the number of object trajectories, $N_s$ represents the number of predicted driving scenarios, $Z_j$ represents the jth object trajectory, $s_i$ represents the ith predicted scenario, $p(s_i)$ represents the probability of a specific predicted scenario, $p(s_i(Z_j))$ represents the probability of a specific object trajectory in a predicted scenario, and $r(s_i(Z_j))$ represents the relevance score of the predicted scenario within the predicted scenario. As such, as shown in Equation 1 the difference between the object trajectory probability and the scenario probability may be weighted with the relevance of the object trajectory. As indicated above, the vehicle may utilize Equation 1 to generate the predicted scenarios and/or the associated probability.

Based on generating the predicted scenario data, the vehicle may use such data when evaluating candidate actions. That is, as described below, the vehicle may send the predicted scenario data to a planning component which may evaluate such data when determining a control trajectory for the vehicle to follow.

For example, a vehicle navigating the environment may utilize the predicted scenario data when evaluating candidate actions (or trajectories). A candidate action may be a trajectory that includes a spatial representation of future movements of the vehicle in addition to one or more vehicle controls (or control data) (e.g., velocity, acceleration, yaw, steering angle, etc.). That is, the candidate actions may include instructions that instruct the vehicle how to navigate a portion of the environment. The candidate actions can include instructions that cause the vehicle to perform one or more actions, such as remain in the same lane, lane change left, lane change right, pass an object proximate the vehicle, modify vehicle kinematics (e.g., velocity, acceleration, etc.), and/or any other type of action. In some examples, a candidate action may include multiple predicted states that can represent the state information of the vehicle at a specific location along the candidate action. State information may include location data, pose data (e.g., lateral offset data, longitudinal offset data, heading offset data), velocity data, acceleration data, and/or other types of data. Examples of various techniques for generating planner actions (or trajectories) for autonomous vehicles can be found, for example, in U.S. Pat. No. 10,921,811, filed on Jan. 22, 2018, issued on Feb. 16, 2021, and titled, "Adaptive Autonomous Vehicle Planner Logic," in U.S. patent application Ser. No. 18/540,642, filed Dec. 14, 2023, and titled "Machine-Learned Cost Estimation in Tree Search Trajectory Generation for Vehicle Control," in U.S. Pat. No. 11,875,678, filed on Jan. 21, 2021 and issued on Jan. 16, 2024, and titled "Unstructured Vehicle Path Planner," and in U.S. Pat. No. 10,955,851, filed on Feb. 14, 2018, issued on Mar. 23, 2021, and titled, "Detecting Blocking Objects," each of which is incorporated by reference herein in its entirety and for all purposes.

In some examples, the planning component may generate a control trajectory which may be a combination of the one or more candidate actions. For instance, to determine which of the one or more candidate actions to follow, the planning component may use a tree structure. Accordingly, the planning component may generate a tree structure that includes some or all of the candidate actions. A tree structure may include one or more nodes representing vehicle states at different action layers of the tree structure. Further, each vehicle state may include multiple candidate actions which the vehicle may follow. As described in more detail below, the planning component may use the tree structure to determine or otherwise select one or more of the candidate actions to follow from a node in the tree structure to a different node at the next layer of the tree structure. The planning component may determine which candidate actions to follow between layers of nodes based on one or more costs. Example techniques for generating a tree structure and determining a control trajectory based on the tree structure can be found, for example, in U.S. application Ser. No. 17/900,658, filed Aug. 21, 2022, and titled "Trajectory Prediction Based on a Decision Tree," the content of which is herein incorporated by reference in its entirety and for all purposes.

In some examples, the planning component can determine a control trajectory based on the tree structure. The planning component can evaluate some or all candidate actions when determining a control trajectory. A solution to the tree may result in a series of nodes of the one or more candidate actions which, when traversed (e.g., moving along and between differing trajectories and/or action layers of the tree structure), results in a control trajectory (e.g., output trajectory) having a lowest determined overall cost. An overall cost for the control trajectory may represent and/or be indicative of the combination of one or more sub-costs. A cost value can indicate the safety, progress, comfort, risk, convenience, and/or efficiency of a candidate trajectory. For instance, a high cost value may indicate heightened degree of risk, danger, inconvenience, discomfort, and/or inefficiency of the trajectory. In contrast, a low cost value may indicate a lower degree of risk, danger, inconvenience, and/or inefficiency of the trajectory. In some examples, sub-costs may include comfort related costs (e.g., acceleration cost, jerk cost, steering cost, path reference cost, etc.—indicative of comfort of a passenger of the vehicle), legality related costs, policy related costs (e.g., a legal cost, a space cost, cyclist perceived safety cost, etc.—indicative of the vehicle abiding by a driving rule), safety related costs (e.g., lane changing costs), progress costs (e.g., a lane blocking cost, a lane ending cost, an exit cost, an approach cost, etc.—indicative of the vehicles timely progress to a destination), debris cost, a space cost, a payment cost, a yaw cost, adversarial cost(s), lane targeting cost (e.g., cost associated with the vehicle being located in a desired lane), cyclist related cost(s), and/or any other type of cost.

In some examples, when determining the cost values, the vehicle may scale (or weight) the costs by the predicted scenario probability and/or a combination (or ratio or product) of the predicted scenario probability and the object trajectory probability. In some examples, the planning component may perform an initial scaling (or weighting) by scaling each cost by the predicted scenario probability. Based on scaling each cost, the planning component may perform an additional (or second or subsequent) scaling operation on a subset of the costs that are impacted by the predicted object trajectories. In some cases, some of the costs may be impacted by the predicted object trajectory (or predicted object trajectories) while other costs are not impacted by the predicted object trajectory (e.g., determined independent of the predicted object trajectory). For example, costs that may be determined based on the predicted object trajectory may be the collision cost, the adversarial cost, etc. Costs that may not be impacted by the object trajectory may include comfort costs, policy costs, progress costs, etc. As such, to increase the accuracy of the costs, the planning component may weight a subset of the costs based on the scenario probability and the object trajectory probability. For example, the vehicle may determine a subset of the costs that are impacted by the predicted object trajectory and weight such costs while not weighting the costs that are not impacted by the predicted object trajectory. Of course, in some cases, the subset of costs that are impacted by the predicted object trajectory may change over time and as such, the vehicle may scale different types of costs at different times. In some examples, scaling the costs may include weighting the costs by a fraction of the predicted trajectory probability and the scenario probability. In some examples, the first and second cost scaling may be performed by performing at least a portion of the following equations:

$$c_s(x_{i,j}, \pi(x_{i,j})) = \hat{C}_x(\pi(x_{i,j})) + \sum_k \frac{p(z_k^j)}{p(x_{0,j})} \hat{C}(x_{i,j}, z_k^i, \pi(x_{i,j})) \quad \text{Equation 2}$$

In this example, $c_s(x_{i,j}, \pi(x_{i,j}))$ may represent the cost value that has been scaled by the ratio of the predicted scenario probability and/or the object trajectory probability. In this case, x may be the state at time step i for scenario j. The $\hat{C}_x$ may be the cost related to the predicted object trajectory. The $$p(z_k^j)$$

may represent the probability of the object trajectory. As shown, the planning component may perform the techniques described in Equation 2 to determine weighted (or scaled) cost values to be used when determining the overall cost of the candidate action.

Upon determining the weighted cost(s), the planning component may determine or otherwise combine the weighted sub-costs into a single overall cost. In some examples, the vehicle may determine to follow a control trajectory that has the lowest overall cost compared to the overall costs of other potential traversal paths between the candidate trajectories.

In some examples, the vehicle may follow the control trajectory while operating within the environment. Upon determining the control trajectory from the tree search, the vehicle may follow the control trajectory throughout the environment. As such, the vehicle may be controlled based on the predicted scenario(s) and/or the predicted scenario probabilities.

Additionally or alternatively, the techniques described herein may also be used on the existence of object(s) in occluded regions. That is, the vehicle may determine (or detect) an occluded region and determine the probability (or likelihood) that an object is located within the occluded region. Further, the vehicle may determine a relevance score that indicates the level of relevance of the object and use the object probability and/or the relevance score when determining the predicted scenarios and/or the predicted scenario probabilities.

The techniques described herein can improve the functioning, safety, and efficiency of autonomous and/or semi-autonomous vehicles operating in various driving environments. Utilizing relevancy data when generating predicted scenarios and predicted scenario probabilities may increase the ability of the vehicle to plan safe and optimal trajectories. That is, the relevancy data my increase the awareness of the vehicle as to which predicted scenarios are more important or relevant to the action of the vehicle than others.

The techniques described herein may be implemented in several ways. Example implementations are provided below with reference to the following figures. Although discussed in the context of an autonomous vehicle, the methods, apparatuses, and systems described herein may be applied to a variety of systems, and are not limited to autonomous vehicles. In another example, the techniques may be utilized in an aviation or nautical context, or in any other system. Additionally, the techniques described herein may be used with real data (e.g., captured using sensor(s)), simulated data (e.g., generated by a simulator), or any combination of the two.

FIG. 1 is a pictorial flow diagram illustrating an example process 100 for generating predicted driving scenario data based on relevance data. As shown in this example, some or all of the operations in the example process 100 may be performed by a scenario management component 102, a perception component, a prediction component, a planning component, and/or any other component or system within an autonomous vehicle.

At operation 104, the scenario management component 102 may receive predicted trajectories associated with object (s). In some examples, a vehicle may navigate within an environment. The vehicle may include one or more sensor devices which may be configured to capture sensor data of the environment. In such cases, the vehicle May analyze the sensor data and detect one or more static and/or dynamic objects proximate the vehicle. For example, box 106 illustrates a vehicle 108 detecting an object 112. In this example, box 106 includes the vehicle 108 approaching an intersection. As shown, the vehicle 108 may include a trajectory 110 which may instruct the vehicle 108 to navigate through the intersection. Additionally, box 106 includes an object 112 which may also be a vehicle; however, in other examples, the object 112 may be any other type of static or dynamic object. In this example, the object 112 may be approaching the intersection from a direction opposite that of the vehicle 108.

Based on detecting the object(s) in the environment, the vehicle may determine predicted object trajectories. That is, to generate safe and/or optimal actions for the vehicle 108 to follow, the scenario management component 102 may receive or determine predicted actions of the object 112. For instance, box 106 illustrates multiple predicted trajectories of the object 112. The predicted trajectories of the object may represent different ways in which the object 112 may move throughout the environment. In this case, the object 112 may include a predicted object trajectory 114 that depicts the object 112 performing a left turn upon entering the junction, a predicted object trajectory 116 that depicts the object 112 performing a left turn upon entering the junction in a manner different than that of the predicted object trajectory 114, a predicted object trajectory 118 that depicts the object 112 straight upon entering the junction, a predicted object trajectory 120 that depicts the object 112 performing a right turn upon entering the junction, and a predicted object trajectory 122 that depicts the object 112 performing a right turn upon entering the junction in a manner different than that of the predicted object trajectory 120. However, this is not intended to be limiting; in other examples, the scenario management component 102 or prediction system may generate more or fewer predicted object trajectories that depict the object 112 navigating in different ways.

At operation 124, the scenario management component 102 may determine a relevance score and probability associated with the object trajectories. That is, the scenario management component 102 may determine the probability (or likelihood) that the object 112 will follow the object trajectory. Further, the scenario management component 102 may determine how relevant the object trajectory is to the vehicle 108. For example, box 126 illustrates a table that includes object trajectory data. As shown, the box 126 includes a table with three columns that are labeled as trajectory, probability, and relevance. Further, the table includes predicted object trajectory 114 and predicted object trajectory 120. However, this is not intended to be limiting; in other examples, the table may include more or fewer of the object trajectories. In this example, the table indicates that the probability that the object 112 will follow predicted object trajectory 114 is 0.2 and that the relevance of the trajectory is 0.8. Further, the table indicates that the probability that the object 112 will follow predicted object trajectory 120 is 0.5 and that the relevance of the trajectory is 0.9.

At operation 128, the scenario management component 102 may determine predicted scenarios based on the relevance and/or probabilities of the object trajectories. The predicted scenario may be a single prediction the environment may evolve over a period of time. For example, when generating the predicted scenario, the vehicle may incorporate a single predicted object trajectory of each object into each predicted scenario. For instance, box 130 illustrates multiple predicted scenarios. That is, in this example, the scenario management component 102 generated three unique predicted scenarios. Each predicted scenario may include a different object trajectory. For instance, the first predicted scenario may include the predicted object trajectory 120, the second predicted scenario may include the predicted object trajectory 118, and the third predicted scenario may include the predicted object trajectory 114. Examples of techniques for generating predicted driving scenarios can be found in, for example, U.S. patent application Ser. No. 18/900,446, filed Sep. 27, 2024, and titled "Scenario Generating," the content of which is herein incorporated by reference in its entirety and for all purposes.

At operation 132, the scenario management component 102 may determine probabilities of the predicted scenario(s) based on the relevance and probabilities associated therewith. The predicted scenario probability may be based on an average of the weighed object trajectory probabilities. For example, box 134 illustrates weighting the object trajectory probability to determine the predicted scenario probability. In this example, box 134 includes a probability of the object trajectory and a relevance of the object trajectory. As shown, the scenario management component 102 may use the probability and the relevance to determine a weighted object trajectory probability. In such cases, the scenario management component 102 may perform such operations on some or all object trajectories for some or all objects in the predicted scenario. Based on determining the weighted object trajectory probabilities, the scenario management component 102 may determine the predicted scenario probability which may be an average of the weighted object trajectories. In some cases, the scenario management component 102 may normalize the predicted scenario probability. Based on determining the predicted scenario probability, the scenario management component 102 may send such data to a planning component of the vehicle which may utilize this data to determine an action for the vehicle to perform.

Figure 2:
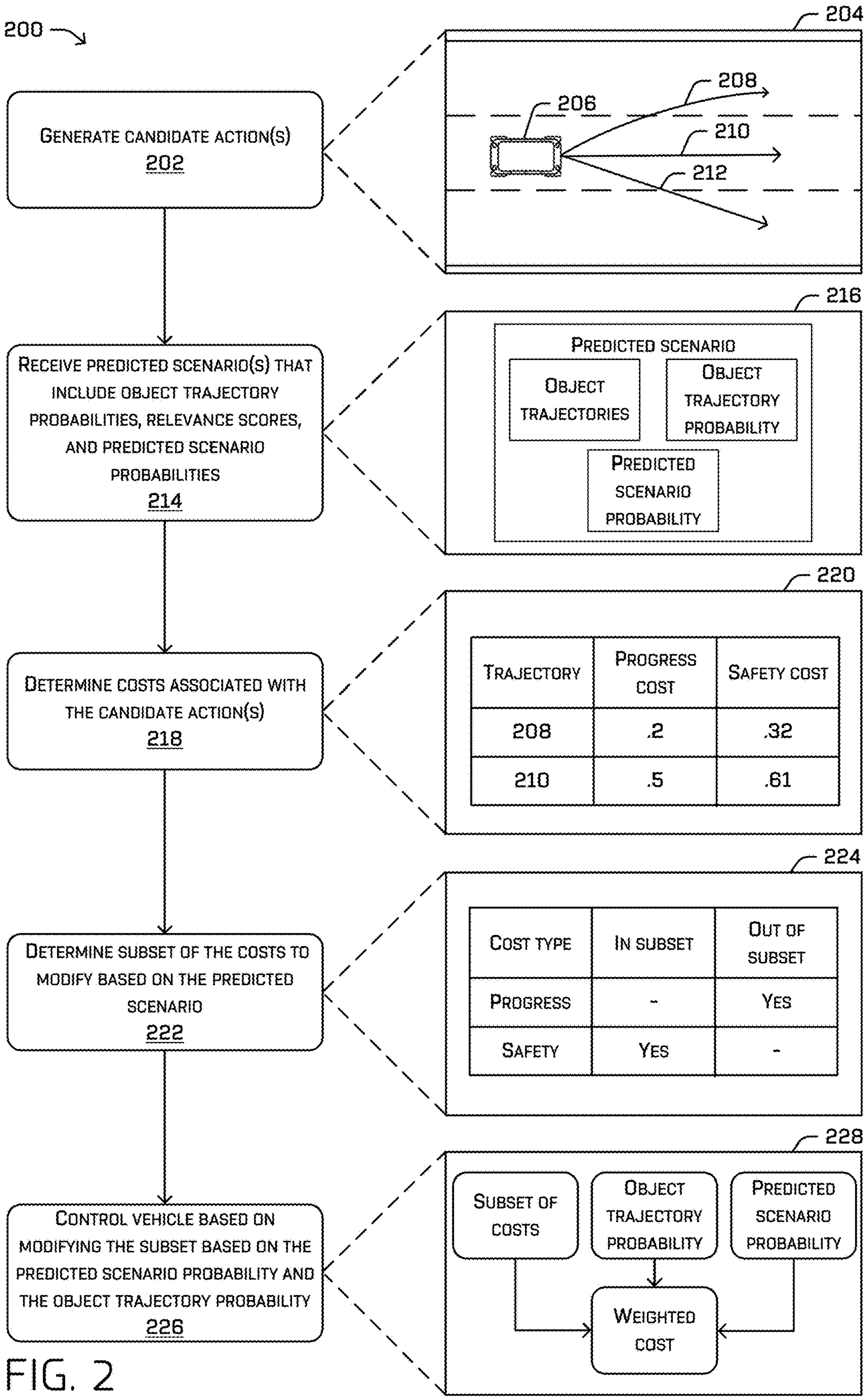
FIG. 2 is a pictorial flow diagram illustrating an example technique for determining costs based on scenario probabilities, in accordance with one or more examples of the disclosure.

FIG. 2 is a pictorial flow diagram illustrating an example process 200 for determining costs based on scenario probabilities. As shown in this example, some or all of the operations in the example process 100 may be performed by a perception component, a prediction component, a planning component, and/or any other component or system within an autonomous vehicle.

At operation 202, the planning component may generate candidate actions. In some examples, a vehicle may navigate an environment to a destination location. When navigating the environment, the vehicle may generate one or more candidate actions that instruct the vehicle how to interact with the roadway. For example, box 204 illustrates a vehicle 206 with multiple candidate actions. As shown, the box 204 includes a candidate action 208 which instructs the vehicle 206 to perform a lane changing maneuver to the left, a candidate action 210 which instructs the vehicle 206 to remain in the current driving lane, and a candidate action 212 which instructs the vehicle 206 to perform a lane changing maneuver to the right. Of course, in other examples, the vehicle may generate more or fewer candidate actions that cause the vehicle to perform the same or different maneuvers.

At operation 214, the vehicle may receive predicted scenario(s) from a prediction component. In some examples, the vehicle may use one or more predicted scenarios to evaluate the candidate actions, as described in operation 202. The predicted scenarios may be generated by a prediction component and/or by a scenario management component (similar or identical to the scenario management component 102). For example, the box 216 illustrates a predicted scenario. In this example, the predicted scenario may include various types of data such as one or more object trajectories, probabilities associated with the object trajectories, and/or a probability of the predicted scenario. Of course, in other examples, the predicted scenario may include more or fewer types of data.

At operation 218, the vehicle may determine costs associated with the candidate actions. As indicated above, the vehicle may determine one or more different types of costs that indicate the safety, efficacy, and/or passenger experience of the candidate action. The vehicle may use the costs to determine which candidate action to follow. For example, the box 220 illustrates multiple types of costs that may be generated. In this example, the box 220 includes a table with candidate action 208 and candidate action 210. The box may include a progress cost and/or a safety cost. Of course, in other examples, the vehicle may generate more or fewer costs that may be the same or different types.

At operation 222, the vehicle may determine a subset of the costs to modify (or scale) based on the predicted scenario. That is, the vehicle may modify the costs determined at operation 218 based on one or more of the object trajectory probability and the predicted scenario probability. The vehicle may determine which costs to modify by determining a subset of costs that are impacted or determined based on the predicted object trajectories. Costs that are impacted by the predicted object trajectories may be, for example, scaled while the costs that are not impacted by the predicted object trajectories may remain unmodified. For example, box 224 illustrates a table that indicates types of costs to include in the subset and types of cost to exclude from the subset. In this example, the table indicates that the progress cost is to be excluded from the subset to modify based on the progress cost being determined independently from the predicted scenario. Further, the box 224 indicates that the safety cost is to be included in the subset to be modified based on the safety cost being determined based on the predicted scenario.

At operation 226, the vehicle may be controlled based on modifying the subset based on the predicted scenario probability and the object trajectory probability. For example, box 228 illustrates modifying the costs in the subset based on a fraction of the object trajectory probability and the predicted scenario probability. As shown, the box 228 includes the subset of costs, the object trajectory probability, and the predicted scenario probability. The vehicle may use such data to weight the costs. As indicated above, the weighted cost may be the initial cost multiplied by a fraction of the object trajectory probability and the predicted scenario probability. In some examples, the vehicle May perform such weighting operations on some or all costs. Based on weighting the costs, the vehicle may analyze the weighted costs to determine a control trajectory for the vehicle to follow. Though not shown, the vehicle may perform an initial scaling of the cost(s) by the predicted scenario probability. That is, the planning component may scale all costs by the predicted scenario probability and subsequently perform an additional scaling of the subset of costs determined at operation 222 using the techniques described in operation 226.

Figure 3:
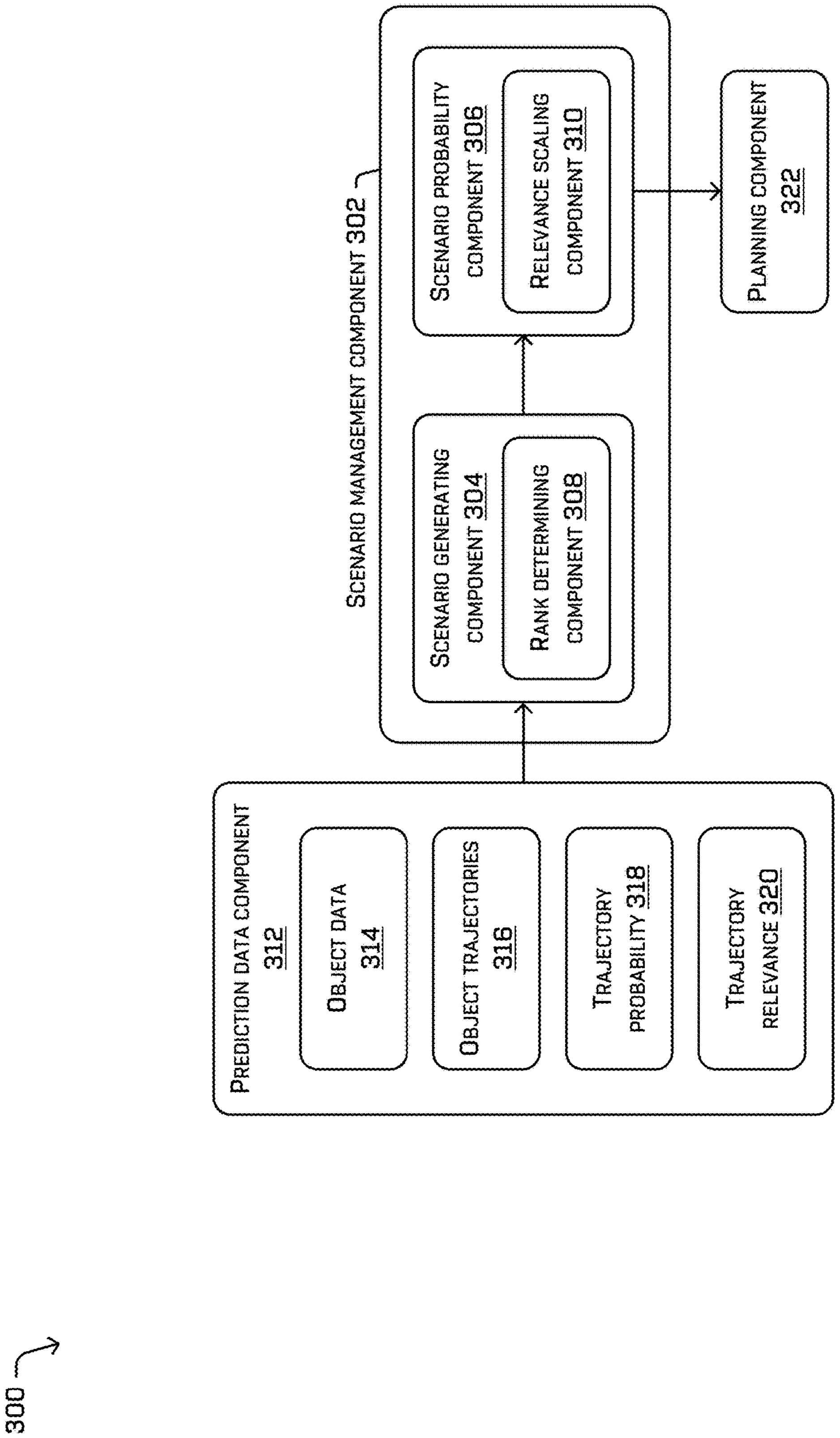
FIG. 3 illustrates an example computing system including a scenario management component configured to generate predicted scenarios based on the relevance of object trajectories, in accordance with one or more examples of the disclosure.

FIG. 3 illustrates an example computing system 300 including a scenario management component 302 configured to generate predicted scenarios based on relevance of object trajectories.

In some examples, the scenario management component 302 may be similar or identical to the scenario management component 102 described above, or in any other examples herein. As noted above, in some cases the scenario management component 302 may be implemented within an autonomous vehicle or offline from the vehicle. In some examples, the scenario management component 302 may include various components, described below, configured to perform different functionalities of a technique for generating driving scenarios. In some examples, the scenario management component 302 may include a scenario generating component 304 configured to generate predicted driving scenarios and/or a scenario probability component 306 configured to determine a probability of a predicted driving scenario.

In some example, the scenario management component 302 may receive predicted data from a prediction data component 312. That is, the prediction component of the vehicle may receive sensor data and determine prediction data based on the sensor data. As shown, the prediction data component 312 may include one or more subcomponents such as an object data component 314 configured to receive, store, and/or analyze data associated with the object (e.g., object type, velocity, size, etc.), an object trajectories component 316 configured to receive, store, and/or analyze predicted object trajectories, a trajectory probabilities component 318 configured to receive, store, and/or analyze probabilities that the object will follow any one of the predicted trajectories, and/or a trajectory relevance component 320 configured to receive, store, and/or analyze relevance scores associated with specific object trajectories.

In some examples, the scenario management component 302 may include a scenario generating component 304 configured to generate predicted driving scenarios. That is, the scenario generating component 304 may receive the prediction data from the prediction data component 312 and use such data to generate predicted scenarios. As described above, examples of techniques for generating predicted driving scenarios can be found in, for example, U.S. patent application Ser. No. 18/900,446, filed Sep. 27, 2024, and titled "Scenario Generating," the content of which is herein incorporated by reference in its entirety and for all purposes.

As shown, the scenario generating component 304 may include a subcomponent called the rank determining component 308 which may be configured to rank the object trajectories and generate a predicted scenario based on the rankings. For example, the rank determining component 308 may determine, for some or all of the object trajectories, a value that may used to rank the object trajectories. The value may be determined by dividing the object trajectory relevance score by the object trajectory probability and, in some instances, a scalar. Based on determining the values for the object trajectories, the rank determining component 308 may order the object trajectories such that the highest ranked object trajectories are the most important to the vehicle. In some cases, the scenario generating component 304 may use the ranking to determine the predicted scenarios. As an example, if there are three predicted scenarios, the scenario generating component 304 may include the highest ranked object trajectory in the first predicted scenario, the next highest ranked trajectory in the second predicted scenario, etc. As shown, the scenario generating component 304 may send the predicted scenarios to the scenario probability component.

In some examples, the scenario management component 302 may include a scenario probability component 306 configured to determine a probability of a predicted driving scenario. As shown, the scenario probability component 306 may receive the predicted scenarios from the scenario generating component 304. In some cases, the scenario probability component 306 may determine a probability that indicates how likely the predicted scenario is to occur relative to the other predicted scenarios. When determining the predicted scenario probability, the scenario probability component 306 may use the relevance scores associated with the object trajectories. For instance, the relevance scaling component 310, which may be a subcomponent of the scenario probability component 306, may scale the object trajectory probabilities in the predicted scenario. That is, the relevance scaling component 310 may multiply the probability of the object trajectory with the relevance score of the object trajectory. Based on scaling the object trajectory probabilities, the scenario probability component 306 may determine the predicted scenario probability by averaging the scaled object trajectory probabilities. Based on determining the predicted scenario probabilities, the scenario probability component 306 may send the predicted scenario and the associated probability data to a planning component 322 which may use the predicted scenario data when planning a control trajectory or other vehicle action for the vehicle to perform.

Figure 4:
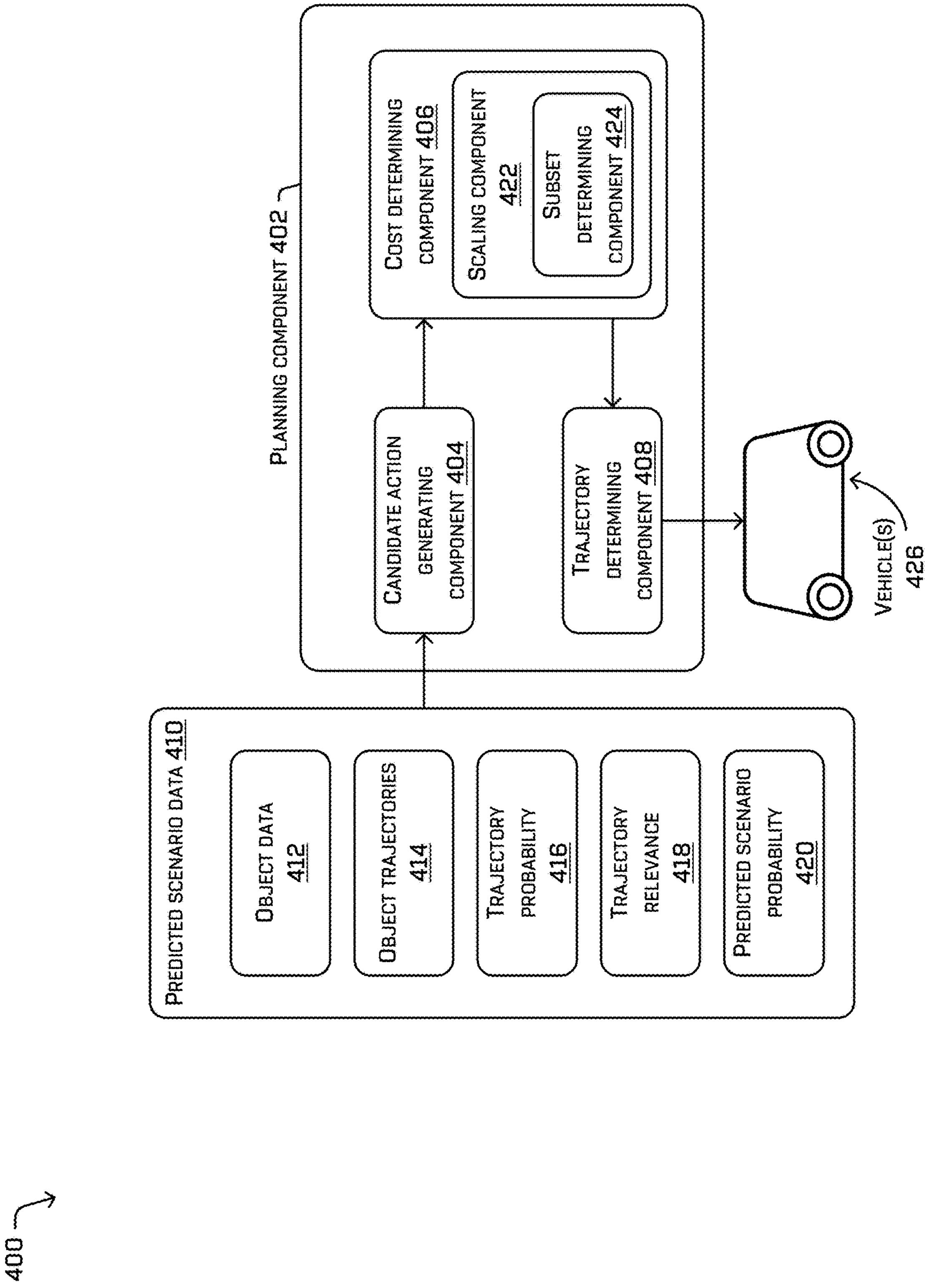
FIG. 4 illustrates an example computing system including a planning component configured to determine control trajectories for a vehicle to follow based on scaling a subset of the costs, in accordance with one or more examples of the disclosure.

FIG. 4 illustrates an example computing system 400 including a planning component 402 configured to determine control trajectories for a vehicle to follow based on scaling a subset of the costs by a fraction of a predicted driving scenario probability and an object trajectory probability.

In some examples, the planning component 402 may be similar or identical to the planning component described above, or in any other examples herein. As noted above, in some cases the planning component 402 may be implemented within an autonomous vehicle or offline from the vehicle. In some examples, the planning component 402 may include various components, described below, configured to perform different functionalities of a technique for generating driving scenarios. In some examples, the planning component 402 may include a candidate action generating component 404 configured to generate candidate actions for the vehicle to follow, a cost determining component 406 configured to determine costs associated with the candidate actions, and/or a trajectory determining component 408 configured to determine a control trajectory for the vehicle to follow.

In some examples, the planning component 402 may receive predicted scenario data 410 (e.g., predicted scenarios). That is, the predicted scenario data 410 may be determined or generated by the scenario management component 302 and/or a prediction component of the vehicle. As shown, the predicted scenario data 410 may include one or more subcomponents such as an object data component 412 configured to receive, store, and/or analyze data associated with the object (e.g., object type, velocity, size, etc.), an object trajectories component 414 configured to receive, store, and/or analyze predicted object trajectories, a trajectory probabilities component 416 configured to receive, store, and/or analyze probabilities that the object will follow any one of the predicted trajectories, a trajectory relevance component 418 configured to receive, store, and/or analyze relevance scores associated with specific object trajectories, and/or a predicted scenario probability component 420 configured to receive, store, and/or analyze probabilities of predicted scenarios.

In some examples, the planning component 402 may include a candidate action generating component 404 configured to generate candidate actions for the vehicle to follow. The candidate action generating component 404 may receive sensor data indicative of the current driving scenario. The candidate action generating component 404 may use such sensor data to generate candidate actions (or trajectories) through the environment. As shown, the candidate action generating component 404 may send candidate action data to the cost determining component 406.

In some examples, the planning component 402 may include a cost determining component 406 configured to determine costs associated with the candidate actions. The cost determining component 406 may receive the candidate actions from the candidate action generating component 404. In some examples, the cost determining component 406 may generate a tree structure that includes some or all of the trajectories. The purpose of the tree structure is to enable the vehicle to evaluate the candidate actions at each state of the vehicle and to determine a control trajectory for the vehicle to follow based on such candidate trajectories. The tree structure may include an initial node (e.g., root node) which represents the state of the vehicle. Multiple candidate actions may extend from the initial node. In such instances, the cost determining component 406 may determine a traversal path based on the candidate actions that results in the traversal path having a lowest determined overall cost. To determine the lowest overall cost, the cost determining component 406 may determine one or more sub-costs that may be combined into the overall cost.

When determining the sub-costs, the cost determining component 406 may utilize the predicted scenario data 410. That is, when analyzing the candidate actions, the cost determining component 406 may weigh the individual sub-costs (or the overall cost) based on an object trajectory probability and the predicted scenario probability. As shown, the cost determining component 406 may include a subcomponent called the scaling component 422 which may be configured to scale the costs by one or more of the object trajectory probability and the predicted scenario probability. That is, initially, the scaling component 422 may scale some or all cost values by the predicted scenario probability. Based on scaling the costs by the predicted scenario probability, the scaling component may scale a subset (e.g., less than all) of the costs by a ratio (or fraction) of the predicted scenario probability and the predicted object trajectory probability. In such cases, the subset determining component 424, which may be a subcomponent of the scaling component 422, may identify or determine a subset of the sub-costs that are impacted or otherwise determined based on the predicted object trajectories. The subset determining component 424 may access a database which indicates which costs are to be included in the subset. Based on determining the subset, the scaling component may weigh the sub-costs in the subset by the fraction of the object trajectory probability and the predicted scenario probability. As such, a portion of the costs of the candidate actions may be weighted based on the object trajectory probability and the predicted scenario probability.

In some examples, the planning component 402 may include a trajectory determining component 408 configured to determine a control trajectory for the vehicle to follow. In such instances, the trajectory determining component 408 may determine a control trajectory for the vehicle to follow based on a combination of the lowest cost candidate actions. That is, the vehicle may determine to follow a control trajectory that has the lowest overall cost compared to the overall costs of the other potential traversal paths between the candidate trajectories. The trajectory determining component 408 may send the trajectory to the vehicle 426 for the vehicle 426 to follow. In such instances, upon receiving the trajectory, the vehicle 426 may be controlled, based on the instructions included in the trajectory, to follow the trajectory throughout the environment.

Figure 5:
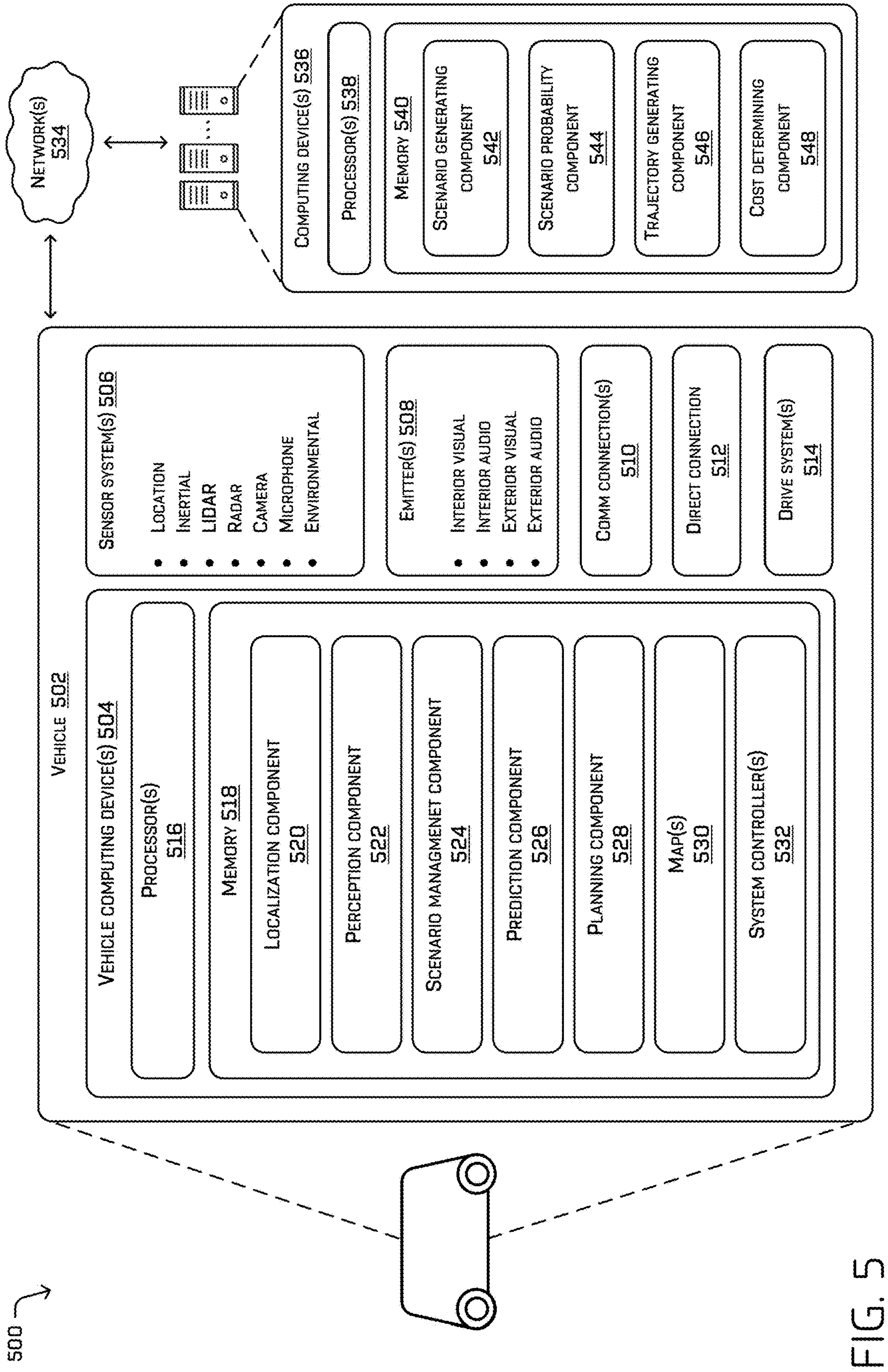
FIG. 5 depicts a block diagram of an example system for implementing various techniques described herein.

FIG. 5 is a block diagram of an example system 500 for implementing the techniques described herein. In at least one example, the system 500 may include a vehicle, such as vehicle 502. The vehicle 502 may include one or more vehicle computing devices 504, one or more sensor systems 506, one or more emitters 508, one or more communication connections 510, at least one direct connection 512, and one or more drive systems 514.

The vehicle computing device 504 may include one or more processors 516 and memory 518 communicatively coupled with the processor(s) 516. In the illustrated example, the vehicle 502 is an autonomous vehicle; however, the vehicle 502 could be any other type of vehicle, such as a semi-autonomous vehicle, or any other system having at least an image capture device (e.g., a camera-enabled smartphone). In some instances, the autonomous vehicle 502 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 502 may be a fully or partially autonomous vehicle having any other level or classification.

In the illustrated example, the memory 518 of the vehicle computing device 504 stores a localization component 520, a perception component 522, a scenario management component 524, a prediction component 526, a planner component 528, one or more system controllers 532, and one or more maps 530 (or map data). Though depicted in FIG. 5 as residing in the memory 518 for illustrative purposes, it is contemplated that the localization component 520, the perception component 522, the prediction component 526, the planner component 528, the scenario management component 524, system controller(s) 532, and/or the map(s) may additionally, or alternatively, be accessible to the vehicle 502 (e.g., stored on, or otherwise accessible by, memory remote from the vehicle 502, such as, for example, on memory 540 of one or more computing device 536). In some examples, the memory 540 may include a scenario generating component 542, a scenario probability component 544, a trajectory generating component 546, and/or a cost determining component 548.

In at least one example, the localization component 520 may include functionality to receive sensor data from the sensor system(s) 506 to determine a position and/or orientation of the vehicle 502 (e.g., one or more of an x-, y-, z-position, roll, pitch, or yaw). For example, the localization component 520 may include and/or request/receive a map of an environment, such as from map(s) 530, and may continuously determine a location and/or orientation of the vehicle 502 within the environment. In some instances, the localization component 520 may utilize SLAM (simultaneous localization and mapping), CLAMS (calibration, localization and mapping, simultaneously), relative SLAM, bundle adjustment, non-linear least squares optimization, or the like to receive image data, lidar data, radar data, inertial measurement unit (IMU) data, GPS data, wheel encoder data, and the like to accurately determine a location of the vehicle 502. In some instances, the localization component 520 may provide data to various components of the vehicle 502 to determine an initial position of the vehicle 502 for determining the relevance of an object to the vehicle 502, as discussed herein.

In some instances, the perception component 522 may include functionality to perform object detection, segmentation, and/or classification. In some examples, the perception component 522 may provide processed sensor data that indicates a presence of an object (e.g., entity) that is proximate to the vehicle 502 and/or a classification of the object as an object type (e.g., car, pedestrian, cyclist, animal, building, tree, road surface, curb, sidewalk, unknown, etc.). In some examples, the perception component 522 may provide processed sensor data that indicates a presence of a stationary entity that is proximate to the vehicle 502 and/or a classification of the stationary entity as a type (e.g., building, tree, road surface, curb, sidewalk, unknown, etc.). In additional or alternative examples, the perception component 522 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

The prediction component 526 may generate one or more probability maps representing prediction probabilities of possible locations of one or more objects in an environment. For example, the prediction component 526 may generate one or more probability maps for vehicles, pedestrians, animals, and the like within a threshold distance from the vehicle 502. In some instances, the prediction component 526 may measure a track of an object and generate a discretized prediction probability map, a heat map, a probability distribution, a discretized probability distribution, and/or a trajectory for the object based on observed and predicted behavior. In some instances, the one or more probability maps may represent an intent of the one or more objects in the environment.

In some examples, the prediction component 526 may generate predicted trajectories of objects (e.g., objects) in an environment. For example, the prediction component 526 may generate one or more predicted trajectories for objects within a threshold distance from the vehicle 502. In some examples, the prediction component 526 may measure a trace of an object and generate a trajectory for the object based on observed and predicted behavior.

In general, the planner component 528 may determine a path for the vehicle 502 to follow to traverse through an environment. For example, the planner component 528 may determine various routes and trajectories and various levels of detail. For example, the planner component 528 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planner component 528 may generate an instruction for guiding the vehicle 502 along at least a portion of the route from the first location to the second location. In at least one example, the planner component 528 may determine how to guide the vehicle 502 from a first waypoint in the sequence of waypoints to a second waypoint in the sequence of waypoints. In some examples, the instruction may be a candidate trajectory, or a portion of a trajectory. In some examples, multiple trajectories may be substantially simultaneously generated (e.g., within technical tolerances) in accordance with a receding horizon technique. A single path of the multiple paths in a receding data horizon having the highest confidence level may be selected to operate the vehicle. In various examples, the planner component 528 may select a trajectory for the vehicle 502.

In other examples, the planner component 528 may alternatively, or additionally, use data from the localization component 520, the perception component 522, and/or the prediction component 526 to determine a path for the vehicle 502 to follow to traverse through an environment. For example, the planner component 528 may receive data (e.g., object data) from the localization component 520, the perception component 522, and/or the prediction component 526 regarding objects associated with an environment. In some examples, the planner component 528 receives data for relevant objects within the environment. Using this data, the planner component 528 may determine a route to travel from a first location (e.g., a current location) to a second location (e.g., a target location) to avoid objects in an environment. In at least some examples, such a planner component 528 may determine there is no such collision-free path and, in turn, provide a path that brings vehicle 502 to a safe stop avoiding all collisions and/or otherwise mitigating damage. Further, the planning component 528 may perform any of the techniques described above with respect to any of FIGS. 1-4 with respect to determining a trajectory for a vehicle to follow based on a probability of a predicted driving scenario.

The scenario management component 524 may perform any of the techniques described above with respect to any of FIGS. 1-4 with respect to generating predicted driving scenario and/or the probabilities associated therewith.

In at least one example, the vehicle computing device 504 may include one or more system controllers 532, which may be configured to control steering, propulsion, braking, safety, emitters, communication, and other systems of the vehicle 502. The system controller(s) 532 may communicate with and/or control corresponding systems of the drive system(s) 514 and/or other components of the vehicle 502.

The memory 518 may further include one or more maps 530 that may be used by the vehicle 502 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 502 may be controlled based at least in part on the map(s) 530. That is, the map(s) 530 may be used in connection with the localization component 520, the perception component 522, the prediction component 526, and/or the planner component 528 to determine a location of the vehicle 502, detect objects in an environment, generate routes, determine actions and/or trajectories to navigate within an environment.

In some examples, the one or more maps 530 may be stored on a remote computing device(s) (such as the computing device(s) 536) accessible via network(s) 534. In some examples, multiple maps 530 may be stored based on, for example, a characteristic (e.g., type of entity, time of day, day of week, season of the year, etc.). Storing multiple maps 530 may have similar memory requirements, but increase the speed at which data in a map may be accessed.

In some instances, aspects of some or all of the components discussed herein may include any models, techniques, and/or machine-learned techniques. For example, in some instances, the components in the memory 518 (and the memory 540, discussed below) may be implemented as a neural network.

As described herein, an exemplary neural network is a technique which passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet-50, ResNet-101, VGG, DenseNet, PointNet, Xception, ConvNeXt, and the like; visual transformer(s) (ViT(s)), such as a bidirectional encoder from image transformers (BEIT), visual bidirectional encoder from transformers (VisualBERT), image generative pre-trained transformer (Image GPT), data-efficient image transformers (DeiT), deeper vision transformer (DeepViT), convolutional vision transformer (CvT), detection transformer (DETR), Miti-DETR, or the like; and/or general or natural language processing transformers, such as BERT, GPT, GPT-2, GPT-3, or the like. In some examples, the ML model discussed herein may comprise PointPillars, SECOND, top-down feature layers (e.g., see U.S. patent application Ser. No. 15/963,833, which is incorporated by reference in its entirety herein for all purposes), and/or VoxelNet. Architecture latency optimizations may include MobilenetV2, Shufflenet, Channelnet, Peleenet, and/or the like. The ML model may comprise a residual block such as Pixor, in some examples.

In at least one example, the sensor system(s) 506 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 506 may include multiple instances of each of these or other types of sensors. For instance, the lidar sensors may include individual lidar sensors located at the corners, front, back, sides, and/or top of the vehicle 502. As another example, the camera sensors may include multiple cameras disposed at various locations about the exterior and/or interior of the vehicle 502. The sensor system(s) 506 may provide input to the vehicle computing device 504. Additionally, or in the alternative, the sensor system(s) 506 may send sensor data, via the one or more networks 534, to the one or more computing device(s) 536 at a particular frequency, after a lapse of a predetermined period of time, in near real-time, etc.

The vehicle 502 may also include one or more emitters 508 for emitting light and/or sound. The emitter(s) 508 may include interior audio and visual emitters to communicate with passengers of the vehicle 502. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 508 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 502 may also include one or more communication connections 510 that enable communication between the vehicle 502 and one or more other local or remote computing device(s). For instance, the communication connection(s) 510 may facilitate communication with other local computing device(s) on the vehicle 502 and/or the drive system(s) 514. Also, the communication connection(s) 510 may allow the vehicle to communicate with other nearby computing device(s) (e.g., computing device 536, other nearby vehicles, etc.) and/or one or more remote sensor system(s) for receiving sensor data. The communications connection(s) 510 also enable the vehicle 502 to communicate with a remote teleoperations computing device or other remote services.

The communications connection(s) 510 may include physical and/or logical interfaces for connecting the vehicle computing device 504 to another computing device or a network, such as network(s) 534. For example, the communications connection(s) 510 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 502 may include one or more drive systems 514. In some examples, the vehicle 502 may have a single drive system 514. In at least one example, if the vehicle 502 has multiple drive systems 514, individual drive systems 514 may be positioned on opposite ends of the vehicle 502 (e.g., the front and the rear, etc.). In at least one example, the drive system(s) 514 may include one or more sensor systems to detect conditions of the drive system(s) 514 and/or the surroundings of the vehicle 502. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders may be unique to the drive system(s) 514. In some cases, the sensor system(s) on the drive system(s) 514 may overlap or supplement corresponding systems of the vehicle 502 (e.g., sensor system(s) 506).

The drive system(s) 514 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 514 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive system(s) 514. Furthermore, the drive system(s) 514 may also include one or more communication connection(s) that enable communication by the respective drive module with one or more other local or remote computing device(s).

In at least one example, the direct connection 512 may provide a physical interface to couple the one or more drive system(s) 514 with the body of the vehicle 502. For example, the direct connection 512 may allow the transfer of energy, fluids, air, data, etc. between the drive system(s) 514 and the vehicle. In some instances, the direct connection 512 may further releasably secure the drive system(s) 514 to the body of the vehicle 502.

In at least one example, the localization component 520, the perception component 522, the scenario management component 524, the prediction component 526, the planner component 528, the one or more system controllers 532, and the one or more maps 530 may process sensor data, as described above, and may send their respective outputs, over the one or more network(s) 534, to the computing device(s) 536. In at least one example, the localization component 520, the perception component 522, the scenario management component 524, the prediction component 526, the planner component 528, the one or more system controllers 532, and the one or more maps 530 may send their respective outputs to the computing device(s) 536 at a particular frequency, after a lapse of a predetermined period of time, in near real-time, etc.

In some examples, the vehicle 502 may send sensor data to the computing device(s) 536 via the network(s) 534. In some examples, the vehicle 502 may receive sensor data from the computing device(s) 536 and/or remote sensor system(s) via the network(s) 534. The sensor data may include raw sensor data and/or processed sensor data and/or representations of sensor data. In some examples, the sensor data (raw or processed) may be sent and/or received as one or more log files.

The computing device(s) 536 may include processor(s) 538 and a memory 540, which may include a scenario generating component 542, a scenario probability component 544, a trajectory generating component 546, and/or a cost determining component 548. In some examples, the memory 540 may store one or more of components that are similar to the component(s) stored in the memory 518 of the vehicle 502. In such examples, the computing device(s) 536 may be configured to perform one or more of the processes described herein with respect to the vehicle 502. In some examples, the scenario generating component 542, the scenario probability component 544, the trajectory generating component 546, and/or the cost determining component 548 may perform substantially similar functions as the scenario management component 524 and/or the planning component 528.

The processor(s) 516 of the vehicle 502 and the processor (s) 538 of the computing device(s) 536 may be any suitable processor capable of executing instructions to process data and perform operations as described herein. By way of example and not limitation, the processor(s) may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 518 and memory 540 are examples of non-transitory computer-readable media. The memory 518 and memory 540 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 5 is illustrated as a distributed system, in alternative examples, components of the vehicle 502 may be associated with the computing device(s) 536 and/or components of the computing device(s) 536 may be associated with the vehicle 502. That is, the vehicle 502 may perform one or more of the functions associated with the computing device(s) 536, and vice versa. The methods described herein represent sequences of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes. In some examples, one or more operations of the method may be omitted entirely. For instance, the operations may include determining a first action and a second action by the vehicle relative to a selected trajectory without determining a respective cost for one or more of the actions by the vehicle. Moreover, the methods described herein may be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Figure 6:
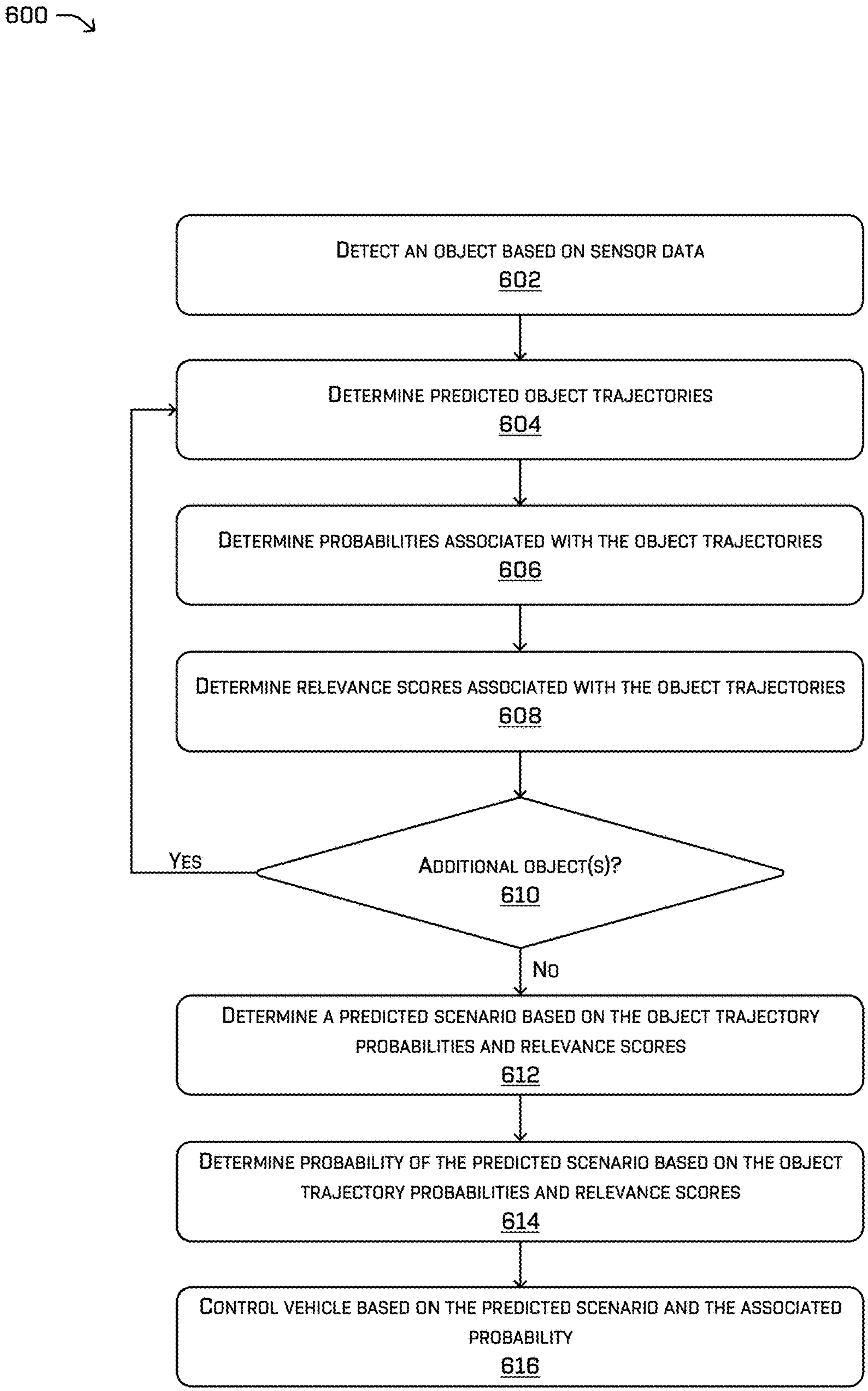
FIG. 6 is a flow diagram illustrating an example process for determining probabilities and relevance scores associated with object trajectories, generating predicted scenarios and associated probabilities based on the object trajectory probabilities and relevance scores, and controlling a vehicle based on the predicted scenarios and associated probabilities, in accordance with one or more examples of the disclosure.

FIG. 6 is a flow diagram illustrating an example process 600 for determining probabilities and relevance scores associated with object trajectories, generating predicted scenarios and associated probabilities based on the object trajectory probabilities and relevance scores, and controlling a vehicle based on the predicted scenarios and associated probabilities. As described below, the process 600 may be performed by one or more computer-based components configured to implement various functionalities described herein. For instance, some or all of the operations of process 600 may be performed by a scenario management component 302 and/or a planning component 402. As described above, a scenario management component 302 and/or a planning component 402 may be integrated as an on-vehicle system in some examples. However, in other examples, the scenario management component 302 and/or the planning component 402 may be integrated as a separate server-based system.

Process 600 is illustrated as collections of blocks in a logical flow diagram, representing sequences of operations, some or all of which can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, encryption, deciphering, compressing, recording, data structures, and the like that perform particular functions or implement particular abstract data types. The order in which the operations are described should not be construed as a limitation.

Any number of the described blocks can be combined in any order and/or in parallel to implement the processes, or alternative processes, and not all of the blocks need to be executed in all examples. For discussion purposes, the processes herein are described in reference to the frameworks, architectures and environments described in the examples herein, although the processes may be implemented in a wide variety of other frameworks, architectures or environments.

At operation 602, the scenario management component may detect an object based on sensor data. In some examples, the vehicle may receive sensor data representative of an environment. That is, the vehicle may capture sensor data while navigating an environment. The vehicle may include one or more sensor device(s) (e.g., lidar device(s), radar device(s), time-of-flight device(s), image capturing device(s), etc.) located or mounted at various positions within or on the vehicle body. In such cases, the sensor device(s) may capture sensor data of the environment proximate the vehicle.

In some examples, the vehicle may detect one or more object(s) based on the sensor data. That is, the vehicle may analyze the sensor data and identify one or more object(s) within the environment. For example, the sensor data may include one or more static and/or dynamic objects such as other vehicle(s) (e.g., cars, trucks, motorcycles, cyclists, etc.), pedestrians, animals, stationary object(s) (e.g., dynamic objects that have a velocity of zero), trees, bushes, buildings, signage, road markings, etc. The vehicle may detect the object(s) using one or more machine learned models. In some examples, the object(s) may include various types of object data (or object features) such as a classification (or type), a pose (e.g., position (e.g., x- and y-coordinate) and/or heading (or yaw)), a size, a velocity, an acceleration, a track (or history), etc.

At operation 604, the scenario management component may determine predicted object trajectories. That is, the vehicle may generate one or more unique object trajectories for some or all object(s) within the environment. Examples of techniques for predicting trajectories for objects in an environment can be found, for example, in U.S. Pat. No. 11,169,531, issued Nov. 9, 2021, and titled "Trajectory Prediction on Top-Down Scenes," the content of which is herein incorporated by reference in its entirety and for all purposes.

At operation 606, the scenario management component may determine probabilities associated with the object trajectories. Further, the vehicle may generate probabilities that indicate the likelihood the object may follow such predicted object trajectories. The vehicle may generate the probabilities based on one or more factors such as a state of the object (e.g., presence of a blinker, current velocity, pose, etc.), object type, time of day, etc.

At operation 608, the scenario management component may determine relevance scores associated with the object trajectories. The relevance score may indicate a level (or degree) of relevance of an object trajectory to the vehicle and/or to a specific vehicle candidate action. In such cases, the vehicle may determine the relevance scores for some or all predicted object trajectories by inputting such trajectories into a relevance filter which may return relevance scores associated therewith. Examples of techniques for determining relevancy can be found, for example, in U.S. Pat. No. 11,772,643, issued Oct. 3, 2023, and titled "Object Relevance Determination" and U.S. patent application Ser. No. 18/375,292, filed on Sep. 29, 2023, and titled "Parallel Processing Filter For Detecting Object Relevance to Vehicle Operation Planning," the contents of both of which are herein incorporated by reference in their entirety and for all purposes.

At operation 610, the scenario management component may determine whether there are additional object(s). As noted above, the vehicle may perform such operations on some or all object(s) within the environment. As such, if there are additional objects that have not yet been accounted for (610: Yes), the vehicle may return to operation 604 and proceed with the operations described above.

In contrast, if all the object(s) in the environment have been included (or otherwise accounted for) (610: No), the vehicle may generate predicted scenarios based on the data described above. That is, at operation 612, the scenario management component may determine a predicted scenario based on the object trajectory probabilities and relevance scores. A predicted scenario may be a single prediction of how object(s) in the environment may move over a period of time. For example, when generating the predicted scenario, the vehicle may incorporate a single predicted object trajectory of each object into each predicted scenario. That is, if there are three predicted driving scenarios, the vehicle may include a single predicted object trajectory from each object into each of the three predicted driving scenarios. Examples of techniques for generating predicted driving scenarios can be found in, for example, U.S. patent application Ser. No. 18/900,446, filed Sep. 27, 2024, and titled "Scenario Generating," the content of which is herein incorporated by reference in its entirety and for all purposes.

In addition to the techniques described in the reference that is incorporated by reference above, the vehicle may generate the predicted scenario based on ranking the object trajectories. The ranking may represent a hierarchy of the object trajectories based on importance to the vehicle. The vehicle may determine the ranking based on the relevance score and/or the object trajectory probabilities. In some cases, the vehicle may determine the rank for a specific object trajectory by dividing the relevance of the object trajectory by the probability of the same object trajectory. The result of such operations may be a value associated with the object trajectory. In some cases, after performing such operations on some or all object trajectories, the vehicle may organize the object trajectories into a ranking. In some cases, the vehicle may generate the predicted scenarios based on the ranking. For example, if there are three predicted scenarios, the vehicle may include the highest ranked object trajectory in the first predicted scenario, the next highest ranked trajectory in the second predicted scenario, etc. Additionally or alternatively, when generating the final predicted scenario, the vehicle may identify, from the object trajectories that are not yet included in a predicted scenario, the predicted object trajectories that have probabilities within a threshold range of one another. In such cases, the vehicle may include one or more of such trajectories into the scenario.

At operation 614, the scenario management component may determine a probability of the predicted scenario based on the object trajectory probability and the relevance scores. The probability of the predicted scenario may represent how likely the scenario is to occur. In some examples, the vehicle may determine the probability of the predicted scenario by weighting the object trajectory probabilities by the associated relevance scores and then averaging the weighted probabilities. For example, for the object trajectories in the driving scenario, the vehicle may determine modified (or weighted) probabilities by weighting (e.g., multiplying) the probability of the object trajectory with the object trajectory relevance score. Based on determining the modified object trajectory probabilities, the vehicle may determine the predicted scenario probability by averaging the modified object trajectory probabilities. As noted below, the vehicle may use the predicted scenario and the predicted scenario probability when determining which candidate action for the vehicle to follow. Additionally or alternatively, the vehicle may determine the predicted scenario probability based on performing Equation 1.

At operation 616, the scenario management component may control the vehicle based on the predicted scenario and the associated probabilities. Based on generating the predicted scenario data, the vehicle may use such data when evaluating candidate actions. That is, as described below, the vehicle may send the predicted scenario data to a planning component which may evaluate such data when determining a control trajectory for the vehicle to follow.

Figure 7:
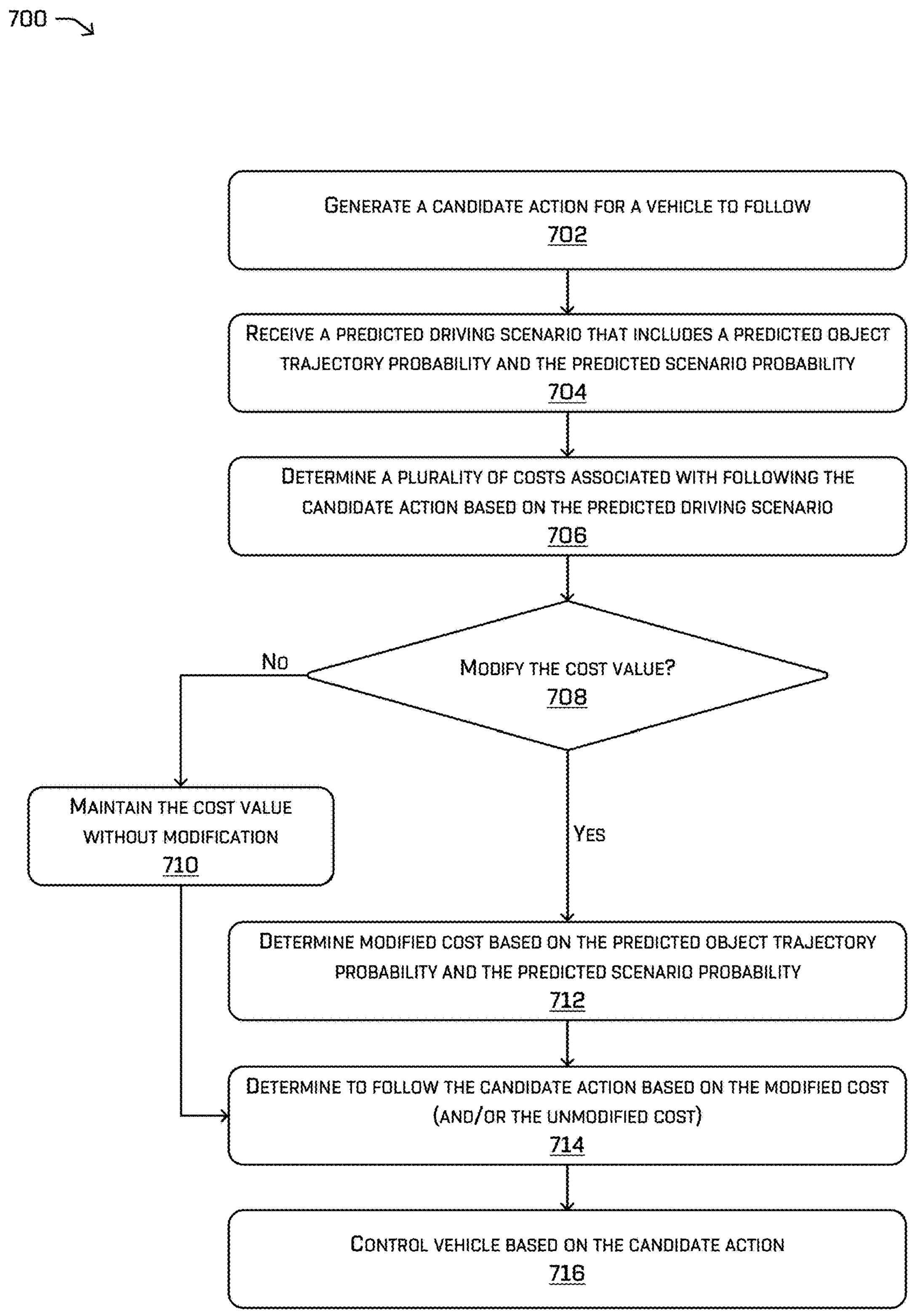
FIG. 7 is a flow diagram illustrating an example process for receiving a predicted driving scenario, determining costs for a candidate action based on the predicted driving scenario, modifying a subset of the costs based on a ration of the predicted scenario probability and an object trajectory probability, and controlling the vehicle based on the modified subset of costs, in accordance with one or more examples of the disclosure.

FIG. 7 is a flow diagram illustrating an example process 700 for receiving a predicted driving scenario, determining costs for a candidate action based on the predicted driving scenario, modifying a subset of the costs based on the predicted scenario probability and an object trajectory probability, and controlling the vehicle based on the modified subset of costs. As described below, the process 700 may be performed by one or more computer-based components configured to implement various functionalities described herein. For instance, some or all of the operations of process 700 may be performed by a scenario management component 302 and/or a planning component 402. As described above, a scenario management component 302 and/or a planning component 402 may be integrated as an on-vehicle system in some examples. However, in other examples, the scenario management component 302 and/or the planning component 402 may be integrated as a separate server-based system.

Process 700 is illustrated as collections of blocks in a logical flow diagram, representing sequences of operations, some or all of which can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, encryption, deciphering, compressing, recording, data structures, and the like that perform particular functions or implement particular abstract data types. The order in which the operations are described should not be construed as a limitation. Any number of the described blocks can be combined in any order and/or in parallel to implement the processes, or alternative processes, and not all of the blocks need to be executed in all examples. For discussion purposes, the processes herein are described in reference to the frameworks, architectures and environments described in the examples herein, although the processes may be implemented in a wide variety of other frameworks, architectures or environments.

At operation 702, the vehicle may generate a candidate action for a vehicle to follow. A candidate action may be a trajectory that includes a spatial representation of future movements of the vehicle in addition to one or more vehicle controls (or control data) (e.g., velocity, acceleration, yaw, steering angle, etc.). That is, the candidate actions may include instructions that instruct the vehicle how to navigate a portion of the environment. The candidate actions can include instructions that cause the vehicle to perform one or more actions, such as remain in the same lane, lane change left, lane change right, pass an object proximate the vehicle, modify vehicle kinematics (e.g., velocity, acceleration, etc.), and/or any other type of action. In some examples, a candidate action may include multiple predicted states that can represent the state information of the vehicle at a specific location along the candidate action. State information may include location data, pose data (e.g., lateral offset data, longitudinal offset data, heading offset data), velocity data, acceleration data, and/or other types of data. Examples of various techniques for generating planner actions (or trajectories) for autonomous vehicles can be found, for example, in U.S. Pat. No. 10,921,811, filed on Jan. 22, 2018, issued on Feb. 16, 2021, and titled, "Adaptive Autonomous Vehicle Planner Logic," in U.S. patent application Ser. No. 18/540,642, filed Dec. 14, 2023, and titled "Machine-Learned Cost Estimation in Tree Search Trajectory Generation for Vehicle Control," in U.S. Pat. No. 11,875,678, filed on Jan. 21, 2021 and issued on Jan. 16, 2024, and titled "Unstructured Vehicle Path Planner," and in U.S. Pat. No. 10,955,851, filed on Feb. 14, 2018, issued on Mar. 23, 2021, and titled, "Detecting Blocking Objects," each of which is incorporated by reference herein in its entirety and for all purposes.

At operation 704, the vehicle may receive a predicted driving scenario that includes a predicted object trajectory probability and a predicted scenario probability. The predicted scenario may be similar or identical to the predicted scenario described throughout and/or as generated by the scenario management component 302. In this example, the predicted scenario may include one or more objects, object trajectories, object trajectory probabilities, object trajectory relevance scores, a predicted scenario probability, etc. As indicated above, the predicted scenario probability may be determined using a combination of the relevancy of certain object(s) and/or object trajectories and/or the probabilities associated therewith. Additional description regarding using the relevance scores to determine the probability of predicted scenarios may be described in FIGS. 1, 3, and 6.

At operation 706, the vehicle may determine a plurality of costs associated with following the candidate action based on the predicted driving scenario. That is, as indicated above, the vehicle may evaluate the candidate actions to determine a control trajectory. Evaluating the candidate actions may include determining the quality and/or efficacy of candidate actions, as represented by cost values. A solution to the tree may result in a series of nodes of the one or more candidate actions which, when traversed (e.g., moving along and between differing trajectories and/or action layers of the tree structure), results in a control trajectory (e.g., output trajectory) having a lowest determined overall cost. An overall cost for the control trajectory may represent and/or be indicative of the combination of one or more sub-costs. A cost value can indicate the safety, progress, comfort, risk, convenience, and/or efficiency of a candidate trajectory. For instance, a high cost value may indicate heightened degree of risk, danger, inconvenience, discomfort, and/or inefficiency of the trajectory. In contrast, a low cost value may indicate a lower degree of risk, danger, inconvenience, and/or inefficiency of the trajectory. In some examples, sub-costs may include comfort related costs (e.g., acceleration cost, jerk cost, steering cost, path reference cost, etc.), legality related costs, policy related costs, safety related costs (e.g., lane changing costs), progress costs, debris cost, a lane blocking cost, a lane ending cost, an exit cost, an approach cost, a space cost, a payment cost, a yaw cost, adversarial cost(s), lane targeting cost (e.g., cost associated with the vehicle being located in a desired lane), cyclist related cost(s), and/or any other type of cost.

At operation 708, the vehicle may determine whether the cost value is to be modified (or scaled). In some cases, some of the costs are impacted by the predicted object trajectories while other costs are not impacted by the predicted object trajectories (e.g., determined independent of the predicted object trajectories). For example, costs that may be determined based on the predicted object trajectories may be the collision cost, the adversarial cost, etc. Costs that may not be impacted by the object trajectories may include comfort costs, policy costs, progress costs, etc. As such, to increase the accuracy of the costs, the planning component may weight a subset of the costs based on the scenario probability and the object trajectory probability. For example, the vehicle may determine a subset of the costs that are impacted by the predicted object trajectories and weight such costs while not weighting the costs that are not impacted by the predicted object trajectories. Of course, in some cases, the subset of costs that are impacted by the predicted scenario may change over time and as such, the vehicle may scale different types of costs at different times. That is, if the costs are not impacted by the predicted object trajectories (708: No), the vehicle may not modify the costs. That is, at operation 710, the vehicle may maintain the cost value without modification.

In contrast, if the costs are impacted by the predicted object trajectories (708: Yes), the vehicle may scale the costs by the object trajectory probability and the scenario probability. That is, at operation 712, the vehicle may determine a modified cost value based on the predicted object trajectory probability and the predicted scenario probability. In some examples, scaling the costs may include weighting the costs by a fraction of the predicted trajectory probability and the scenario probability.

At operation 714, the vehicle may determine to follow the candidate action based on the modified cost (and/or the unmodified cost). Upon determining the weighted cost(s), the planning component may determine or otherwise combine the weighted sub-costs into a single overall cost. In some examples, the vehicle may determine to follow a control trajectory that has the lowest overall cost compared to the overall costs of other potential traversal paths between the candidate trajectories.

At operation 716, the vehicle may control the vehicle based on the candidate action. Upon determining the control trajectory from the tree search, the vehicle may follow the control trajectory throughout the environment. As such, the vehicle may be controlled based on the predicted scenario(s) and/or the predicted scenario probabilities.

Example Clauses

A: A system comprising: one or more processors; and one or more non-transitory computer-readable media storing computer-executable instructions that, when executed, cause the system to perform operations comprising: receiving, from a sensor associated with an autonomous vehicle, sensor data of an environment; detecting, based at least in part on the sensor data, an object in the environment; determining a plurality of predicted object trajectories associated with the object, a predicted object trajectory of the plurality of predicted object trajectories being associated with a predicted object trajectory probability; determining, for the predicted object trajectory, a relevance score representing a level of relevance to a candidate trajectory of the autonomous vehicle; determining, based at least in part on the plurality of predicted object trajectories and the relevance score, a predicted scenario; determining, based at least in part on the predicted object trajectory probability and the relevance score, a probability of the predicted scenario; and controlling the autonomous vehicle based at least in part on the probability of the predicted scenario.

B: The system of paragraph A, wherein determining the probability of the predicted scenario comprises: determining, as the probability of the predicted scenario, a product of the predicted object trajectory probability and the relevance score.

C: The system of paragraph A, wherein determining the predicted scenario is further based at least in part on: determining a value based at least in part on dividing the relevance score by the probability of the predicted object trajectory; and ranking the plurality of predicted object trajectories based on the value.

D: The system of paragraph A, wherein determining the predicted scenario is further based at least in part on: determining that a second object trajectory of the plurality of predicted object trajectories has a second probability that is within a threshold range of a third probability of a third object trajectory of the plurality of predicted object trajectories; and determining, based at least in part on the second probability being within the threshold range of the third probability, to include the second object trajectory and the third object trajectory in the predicted scenario.

E: The system of paragraph A, wherein determining, based at least in part on the relevance score, the probability of the predicted scenario is based at least in part on minimizing a difference between the probability of the predicted scenario and a probability of an object trajectory within the predicted scenario.

F: One or more non-transitory computer-readable media storing instructions executable by one or more processors, wherein the instructions, when executed, cause a system to perform operations comprising: receiving sensor data of an environment; detecting, based at least in part on the sensor data, an object in the environment; determining a plurality of predicted object trajectories associated with the object, a predicted object trajectory of the plurality of predicted object trajectories being associated with a predicted object trajectory probability; determining, for the predicted object trajectory, a relevance score representing a level of relevance to a candidate trajectory of a vehicle; determining, based at least in part on the predicted object trajectory probability and the relevance score, a predicted scenario; and determining, based at least in part on the predicted object trajectory probability and the relevance score, a probability of the predicted scenario.

G: The one or more non-transitory computer-readable media of paragraph F, wherein determining the probability of the predicted scenario comprises: determining, as the probability of the predicted scenario, a product of the predicted object trajectory probability and the relevance score.

H: The one or more non-transitory computer-readable media of paragraph F, wherein determining the predicted scenario is further based at least in part on: a ranking of the plurality of predicted object trajectories according to their relevance scores.

I: The one or more non-transitory computer-readable media of paragraph F, wherein determining the predicted scenario is further based at least in part on: determining that a second object trajectory of the plurality of predicted object trajectories has a second probability that is within a threshold range of a third probability of a third object trajectory of the plurality of predicted object trajectories; and determining, based at least in part on the second probability being within the threshold range of the third probability, to include the second object trajectory and the third object trajectory in the predicted scenario.

J: The one or more non-transitory computer-readable media of paragraph F, wherein determining, based at least in part on the relevance score, the probability of the predicted scenario is based at least in part on minimizing a difference between the probability of the predicted scenario and a probability of an object trajectory within the predicted scenario.

K: The one or more non-transitory computer-readable media of paragraph F, the operations further comprising: controlling the vehicle based at least in part on the probability of the predicted scenario.

L: The one or more non-transitory computer-readable media of paragraph K, wherein controlling the vehicle comprises: determining a plurality of costs associated with following the candidate trajectory; determining a first subset of the plurality of costs that are associated with the predicted object trajectory and a second subset of the plurality of costs that are independent of the predicted object trajectory; and determining, based at least in part on the probability of the predicted scenario and the predicted object trajectory probability, weighted costs for the first subset, wherein controlling the vehicle is based at least in part on the weighted costs and the second subset.

M: The one or more non-transitory computer-readable media of paragraph L, wherein the second subset of the plurality of costs include at least one of: a comfort cost, a policy cost, or a progress cost.

N: A method comprising: receiving sensor data of an environment; detecting, based at least in part on the sensor data, an object in the environment; determining a plurality of predicted object trajectories associated with the object, a predicted object trajectory of the plurality of predicted object trajectories being associated with a predicted object trajectory probability; determining, for the predicted object trajectory, a relevance score representing a level of relevance to a candidate trajectory of a vehicle; determining, based at least in part on the predicted object trajectory probability and the relevance score, a predicted scenario; and determining, based at least in part on the predicted object trajectory probability and the relevance score, a probability of the predicted scenario.

O: The method of paragraph N, wherein determining the probability of the predicted scenario comprises: determining, as the probability of the predicted scenario, a product of the predicted object trajectory probability and the relevance score.

P: The method of paragraph N, wherein determining the predicted scenario is further based at least in part on: a ranking of the plurality of predicted object trajectories according to their relevance scores.

Q: The method of paragraph N, wherein determining the predicted scenario is further based at least in part on: determining that a second object trajectory of the plurality of predicted object trajectories has a second probability that is within a threshold range of a third probability of a third object trajectory of the plurality of predicted object trajectories; and determining, based at least in part on the second probability being within the threshold range of the third probability, to include the second object trajectory and the third object trajectory in the predicted scenario.

R: The method of paragraph N, wherein determining, based at least in part on the relevance score, the probability of the predicted scenario is based at least in part on minimizing a difference between the probability of the predicted scenario and a probability of an object trajectory within the predicted scenario.

S: The method of paragraph N, further comprising: controlling the vehicle based at least in part on the probability of the predicted scenario.

T: The method of paragraph S, wherein controlling the vehicle comprises: determining a plurality of costs associated with following the candidate trajectory; determining a first subset of the plurality of costs that are associated with the predicted object trajectory and a second subset of the plurality of costs that are independent of the predicted object trajectory; and determining, based at least in part on the probability of the predicted scenario and the predicted object trajectory probability, weighted costs for the first subset, wherein controlling the vehicle is based at least in part on the weighted costs and the second subset.

U: A system comprising: one or more processors; and one or more non-transitory computer-readable media storing computer-executable instructions that, when executed, cause the system to perform operations comprising: generating a candidate action for an autonomous vehicle to follow; receiving a predicted driving scenario that includes: an object, a predicted object trajectory, a probability of the predicted object trajectory, and a probability of the predicted driving scenario; determining, based at least in part on the predicted driving scenario, a plurality of costs associated with following the candidate action; determining a subset of costs of the plurality of costs, the subset of costs being less than all of the plurality of costs; determining, for a cost value of the subset of costs and based at least in part on the probability of the predicted object trajectory and the probability of the predicted driving scenario, a modified cost value; determining, based at least in part on the modified cost value, to follow the candidate action; and controlling the autonomous vehicle based at least in part on the candidate action.

V: The system of paragraph U, wherein the subset of costs is a first subset of costs, wherein determining the modified cost value comprises: determining the first subset of costs of the plurality of costs based at least in part on the first subset of costs being impacted by the predicted object trajectory; determining a second subset of costs of the plurality of costs that are not impacted by the predicted object trajectory; and determining a modified subset of costs by modifying the first subset of costs with the probability of the predicted object trajectory and the probability of the predicted driving scenario, wherein the second subset of costs are unmodified.

W: The system of paragraph V, wherein the second subset of costs include at least one of: a comfort cost indicative of comfort of a passenger of the autonomous vehicle, a progress cost indicative of the autonomous vehicle timely progress to a destination, or a policy cost indicative of the autonomous vehicle abiding by a driving rule.

X: The system of paragraph V, wherein the modified cost value is a first modified cost value, wherein determining the first modified cost value is based at least in part on: determining, based at least in part on combining the cost value with the probability of the predicted driving scenario, a second modified cost; and determining, in response to determining the second modified cost and based at least in part on the cost value being within the subset of costs, the first modified cost value by multiplying the first modified cost value by a combination of the probability of the predicted driving scenario and the probability of the predicted object trajectory.

Y: The system of paragraph U, wherein determining the modified cost value is based at least in part on a ratio of the probability of the predicted object trajectory and the probability of the predicted driving scenario.

Z: One or more non-transitory computer-readable media storing instructions executable by one or more processors, wherein the instructions, when executed, cause a system to perform operations comprising: generating a candidate action for a vehicle to follow; receiving a predicted driving scenario that includes: a probability of a predicted object trajectory, and a probability of the predicted driving scenario; determining, based at least in part on the predicted driving scenario, a cost value associated with following the candidate action; determining, for the cost value and based at least in part on the probability of the predicted object trajectory and the probability of the predicted driving scenario, a modified cost value; and determining, based at least in part on the modified cost value, to follow the candidate action.

AA: The one or more non-transitory computer-readable media of paragraph Z, wherein determining the modified cost value comprises: determining a first subset of costs of a plurality of costs that are dependent on an object associated with the predicted driving scenario; determining a second subset of costs of the plurality of costs that are independent of the object; and determining a modified subset of costs by modifying the first subset of costs with the probability of the predicted object trajectory and the probability of the predicted driving scenario, wherein the second subset of costs are unmodified.

AB: The one or more non-transitory computer-readable media of paragraph AA, wherein the second subset of costs include at least one of: a comfort cost indicative of comfort of a passenger of the vehicle, a progress cost indicative of the vehicle timely progress to a destination, or a policy cost indicative of the vehicle abiding by a driving rule.

AC: The one or more non-transitory computer-readable media of paragraph AA, wherein the modified cost value is a first modified cost value, wherein determining the first modified cost value is based at least in part on: determining, based at least in part on combining the cost value with the probability of the predicted driving scenario, a second modified cost; and determining, in response to determining the second modified cost and based at least in part on the cost value being within the first subset of costs, the first modified cost value by multiplying the first modified cost value by a combination of the probability of the predicted driving scenario and the probability of the predicted object trajectory.

AD: The one or more non-transitory computer-readable media of paragraph Z, wherein determining the modified cost value is based at least in part on a ratio of the probability of the predicted object trajectory and the probability of the predicted driving scenario.

AE: The one or more non-transitory computer-readable media of paragraph Z, wherein the probability of the predicted driving scenario is determined based at least in part on: determining a relevance score associated with the predicted object trajectory; determining, for the predicted object trajectory and based at least in part on the probability of the predicted object trajectory and the relevance score, a weighted probability, wherein determining the probability of the predicted driving scenario is based at least in part on the weighted probability.

AF: The one or more non-transitory computer-readable media of paragraph Z, wherein the predicted driving scenario is determined based at least in part on: determining a relevance score associated with the predicted object trajectory; determining, based at least in part on the predicted object trajectory and the relevance score, a ranking of the predicted object trajectory, wherein the predicted driving scenario is determined based at least in part on the ranking.

AG: The one or more non-transitory computer-readable media of paragraph Z, the operations further comprising: controlling the vehicle based at least in part on the candidate action.

AH: A method comprising: generating a candidate action for a vehicle to follow; receiving a predicted driving scenario that includes: a probability of a predicted object trajectory, and a probability of the predicted driving scenario; determining, based at least in part on the predicted driving scenario, a cost value associated with following the candidate action; determining, for the cost value and based at least in part on the probability of the predicted object trajectory and the probability of the predicted driving scenario, a modified cost value; and determining, based at least in part on the modified cost value, to follow the candidate action.

AI: The method of paragraph AH, wherein determining the modified cost value comprises: determining a first subset of costs of a plurality of costs that are dependent on an object associated with the predicted driving scenario; determining a second subset of costs of the plurality of costs that are independent of the object; and determining a modified subset of costs by modifying the first subset of costs with the probability of the predicted object trajectory and the probability of the predicted driving scenario, wherein the second subset of costs are unmodified.

AJ: The method of paragraph AI, wherein the second subset of costs include at least one of: a comfort cost indicative of comfort of a passenger of the vehicle, a progress cost indicative of the vehicle timely progress to a destination, or a policy cost indicative of the vehicle abiding by a driving rule.

AK: The method of paragraph AI, wherein the modified cost value is a first modified cost value, wherein determining the first modified cost value is based at least in part on: determining, based at least in part on combining the cost value with the probability of the predicted driving scenario, a second modified cost; and determining, in response to determining the second modified cost and based at least in part on the cost value being within the first subset of costs, the first modified cost value by multiplying the first modified cost value by a combination of the probability of the predicted driving scenario and the probability of the predicted object trajectory.

AL: The method of paragraph AH, wherein determining the modified cost value is based at least in part on a ratio of the probability of the predicted object trajectory and the probability of the predicted driving scenario.

AM: The method of paragraph AH, wherein the probability of the predicted driving scenario is determined based at least in part on: determining a relevance score associated with the predicted object trajectory; determining, for the predicted object trajectory and based at least in part on the probability of the predicted object trajectory and the relevance score, a weighted probability, wherein determining the probability of the predicted driving scenario is based at least in part on the weighted probability.

AN: The method of paragraph AH, wherein the predicted driving scenario is determined based at least in part on: determining a relevance score associated with the predicted object trajectory; determining, based at least in part on the predicted object trajectory and the relevance score, a ranking of the predicted object trajectory, wherein the predicted driving scenario is determined based at least in part on the ranking.

While the example clauses described above are described with respect to particular implementations, it should be understood that, in the context of this document, the content of the example clauses can be implemented via a method, device, system, a computer-readable medium, and/or another implementation. Additionally, any of examples A-AN may be implemented alone or in combination with any other one or more of the examples A-AN.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:

one or more processors; and one or more non-transitory computer-readable media storing computer-executable instructions that, when executed, cause the system to perform operations comprising:

receiving, from a sensor associated with an autonomous vehicle, sensor data of an environment;

detecting, based at least in part on the sensor data, an object in the environment;

determining a plurality of predicted object trajectories associated with the object, a predicted object trajectory of the plurality of predicted object trajectories being associated with a predicted object trajectory probability;

determining, for the predicted object trajectory, a relevance score representing a level of relevance to a candidate trajectory of the autonomous vehicle;

determining, based at least in part on the plurality of predicted object trajectories and the relevance score, a predicted scenario;

determining, based at least in part on the predicted object trajectory probability and the relevance score, a probability of the predicted scenario; and controlling the autonomous vehicle based at least in part on the probability of the predicted scenario.

2. The system of claim 1, wherein determining the probability of the predicted scenario comprises:

determining, as the probability of the predicted scenario, a product of the predicted object trajectory probability and the relevance score.

3. The system of claim 1, wherein determining the predicted scenario is further based at least in part on:

determining a value based at least in part on dividing the relevance score by the probability of the predicted object trajectory; and ranking the plurality of predicted object trajectories based on the value.

4. The system of claim 1, wherein determining the predicted scenario is further based at least in part on:

determining that a second object trajectory of the plurality of predicted object trajectories has a second probability that is within a threshold range of a third probability of a third object trajectory of the plurality of predicted object trajectories; and determining, based at least in part on the second probability being within the threshold range of the third probability, to include the second object trajectory and the third object trajectory in the predicted scenario.

5. The system of claim 1, wherein determining, based at least in part on the relevance score, the probability of the predicted scenario is based at least in part on minimizing a difference between the probability of the predicted scenario and a probability of an object trajectory within the predicted scenario.

6. One or more non transitory computer readable media storing instructions executable by one or more processors, wherein the instructions, when executed, cause a system to perform operations comprising:

receiving sensor data of an environment;

detecting, based at least in part on the sensor data, an object in the environment;

determining a plurality of predicted object trajectories associated with the object, a predicted object trajectory of the plurality of predicted object trajectories being associated with a predicted object trajectory probability;

determining, for the predicted object trajectory, a relevance score representing a level of relevance to a candidate trajectory of a vehicle;

determining, based at least in part on the predicted object trajectory probability and the relevance score, a predicted scenario;

determining, based at least in part on the predicted object trajectory probability and the relevance score, a probability of the predicted scenario; and controlling the vehicle based at least in part on the probability of the predicted scenario.

7. The one or more non transitory computer readable media of claim 6, wherein determining the probability of the predicted scenario comprises:

determining, as the probability of the predicted scenario, a product of the predicted object trajectory probability and the relevance score.

8. The one or more non transitory computer readable media of claim 6, wherein determining the predicted scenario is further based at least in part on:

a ranking of the plurality of predicted object trajectories according to their relevance scores.

9. The one or more non transitory computer readable media of claim 6, wherein determining the predicted scenario is further based at least in part on:

determining that a second object trajectory of the plurality of predicted object trajectories has a second probability that is within a threshold range of a third probability of a third object trajectory of the plurality of predicted object trajectories; and determining, based at least in part on the second probability being within the threshold range of the third probability, to include the second object trajectory and the third object trajectory in the predicted scenario.

10. The one or more non transitory computer readable media of claim 6, wherein determining, based at least in part on the relevance score, the probability of the predicted scenario is based at least in part on minimizing a difference between the probability of the predicted scenario and a probability of an object trajectory within the predicted scenario.

11. The one or more non transitory computer readable media of claim 6, wherein controlling the vehicle comprises:

determining a plurality of costs associated with following the candidate trajectory;

determining a first subset of the plurality of costs that are associated with the predicted object trajectory and a second subset of the plurality of costs that are independent of the predicted object trajectory; and determining, based at least in part on the probability of the predicted scenario and the predicted object trajectory probability, weighted costs for the first subset, wherein controlling the vehicle is based at least in part on the weighted costs and the second subset.

12. The one or more non transitory computer readable media of claim 11, wherein the second subset of the plurality of costs includes at least one of:

a comfort cost, a policy cost, or a progress cost.

13. A method comprising:

receiving sensor data of an environment;

detecting, based at least in part on the sensor data, an object in the environment;

determining a plurality of predicted object trajectories associated with the object, a predicted object trajectory of the plurality of predicted object trajectories being associated with a predicted object trajectory probability;

determining, for the predicted object trajectory, a relevance score representing a level of relevance to a candidate trajectory of a vehicle;

determining, based at least in part on the predicted object trajectory probability and the relevance score, a predicted scenario;

determining, based at least in part on the predicted object trajectory probability and the relevance score, a probability of the predicted scenario; and controlling the vehicle based at least in part on the probability of the predicted scenario.

14. The method of claim 13, wherein determining the probability of the predicted scenario comprises:

determining, as the probability of the predicted scenario, a product of the predicted object trajectory probability and the relevance score.

15. The method of claim 13, wherein determining the predicted scenario is further based at least in part on:

a ranking of the plurality of predicted object trajectories according to their relevance scores.

16. The method of claim 13, wherein determining the predicted scenario is further based at least in part on:

determining that a second object trajectory of the plurality of predicted object trajectories has a second probability that is within a threshold range of a third probability of a third object trajectory of the plurality of predicted object trajectories; and determining, based at least in part on the second probability being within the threshold range of the third probability, to include the second object trajectory and the third object trajectory in the predicted scenario.

17. The method of claim 13, wherein determining, based at least in part on the relevance score, the probability of the predicted scenario is based at least in part on minimizing a difference between the probability of the predicted scenario and a probability of an object trajectory within the predicted scenario.

18. The method of claim 13, wherein controlling the vehicle comprises:

determining a plurality of costs associated with following the candidate trajectory;

determining a first subset of the plurality of costs that are associated with the predicted object trajectory and a second subset of the plurality of costs that are independent of the predicted object trajectory; and determining, based at least in part on the probability of the predicted scenario and the predicted object trajectory probability, weighted costs for the first subset, wherein controlling the vehicle is based at least in part on the weighted costs and the second subset.

19. The method of claim 18, wherein the second subset of the plurality of costs includes at least one of:

a comfort cost, a policy cost, or a progress cost.

20. The system of claim 1, wherein controlling the autonomous vehicle comprises:

determining a plurality of costs associated with following the candidate trajectory;

determining a first subset of the plurality of costs that are associated with the predicted object trajectory and a second subset of the plurality of costs that are independent of the predicted object trajectory; and determining, based at least in part on the probability of the predicted scenario and the predicted object trajectory probability, weighted costs for the first subset, wherein controlling the autonomous vehicle is based at least in part on the weighted costs and the second subset.

* * * * *